(12) United States Patent
Kawamuki et al.

(10) Patent No.: US 8,300,331 B2
(45) Date of Patent: Oct. 30, 2012

(54) LENS UNIT AND LENS DRIVING APPARATUS

(75) Inventors: Ryohhei Kawamuki, Tenri (JP); Hideaki Fujita, Nara (JP); Masayuki Nishikawa, Higashiosaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 561 days.

(21) Appl. No.: 12/083,767

(22) PCT Filed: Oct. 17, 2006

(86) PCT No.: PCT/JP2006/320680
§ 371 (c)(1),
(2), (4) Date: May 28, 2010

(87) PCT Pub. No.: WO2007/046391
PCT Pub. Date: Apr. 26, 2007

(65) Prior Publication Data
US 2010/0246034 A1 Sep. 30, 2010

(30) Foreign Application Priority Data
Oct. 18, 2005 (JP) .................................. 2005-303365

(51) Int. Cl.
*G02B 7/02* (2006.01)
(52) U.S. Cl. .......................... 359/819; 359/811; 359/813
(58) Field of Classification Search .................. 359/811, 359/813, 819, 822–824
See application file for complete search history.

(56) References Cited

U.S. PATENT DOCUMENTS

| 5,815,325 | A | 9/1998 | Johnson |
| 6,714,357 | B2 * | 3/2004 | Yamazaki ..................... 359/696 |
| 7,903,355 | B2 * | 3/2011 | Abe et al. ..................... 359/819 |
| 2001/0043411 | A1 | 11/2001 | Emura et al. |
| 2002/0075571 | A1 | 6/2002 | Chikami et al. |
| 2005/0104996 | A1 | 5/2005 | Makii |
| 2006/0285232 | A1 | 12/2006 | Hayashi |
| 2007/0177046 | A1 | 8/2007 | Makii |

FOREIGN PATENT DOCUMENTS

CN 2419058 2/2001
(Continued)

OTHER PUBLICATIONS

International Report on Patentability, Sep. 9, 2008, issued in PCT/JP2006/320680.
International Search Report, PCT/JP2006/320680, Jan. 18, 2007.

*Primary Examiner* — David N Spector
*Assistant Examiner* — Brandi Thomas
(74) *Attorney, Agent, or Firm* — Edwards Wildman Palmer LLP; David G. Conlin; David A. Tucker

(57) ABSTRACT

A lens unit and a lens driving apparatus are provided. First to third guide members have first to third axis lines, and the first to third axis lines are arranged in parallel with each other. A first lens holder has a first lens held by a first lens holding portion with a first main sliding portion guided by sliding on the first guide member, and a first sub sliding portion guided by sliding on the third guide member. A second lens holder has a second lens held coaxially with the first lens by a second lens holding portion with a second main sliding portion guided by sliding on the second guide member, and a second sub sliding portion guided by the third guide member.

17 Claims, 13 Drawing Sheets

FOREIGN PATENT DOCUMENTS

| | | |
|---|---|---|
| CN | 1611974 | 5/2005 |
| JP | 9-113791 A | 5/1997 |
| JP | 2001-242366 | 9/2001 |
| JP | 2002-131611 | 5/2002 |
| JP | 2002-189165 | 7/2002 |
| JP | 2005-234075 A | 9/2005 |
| WO | WO-2005/033761 A1 | 4/2005 |

* cited by examiner

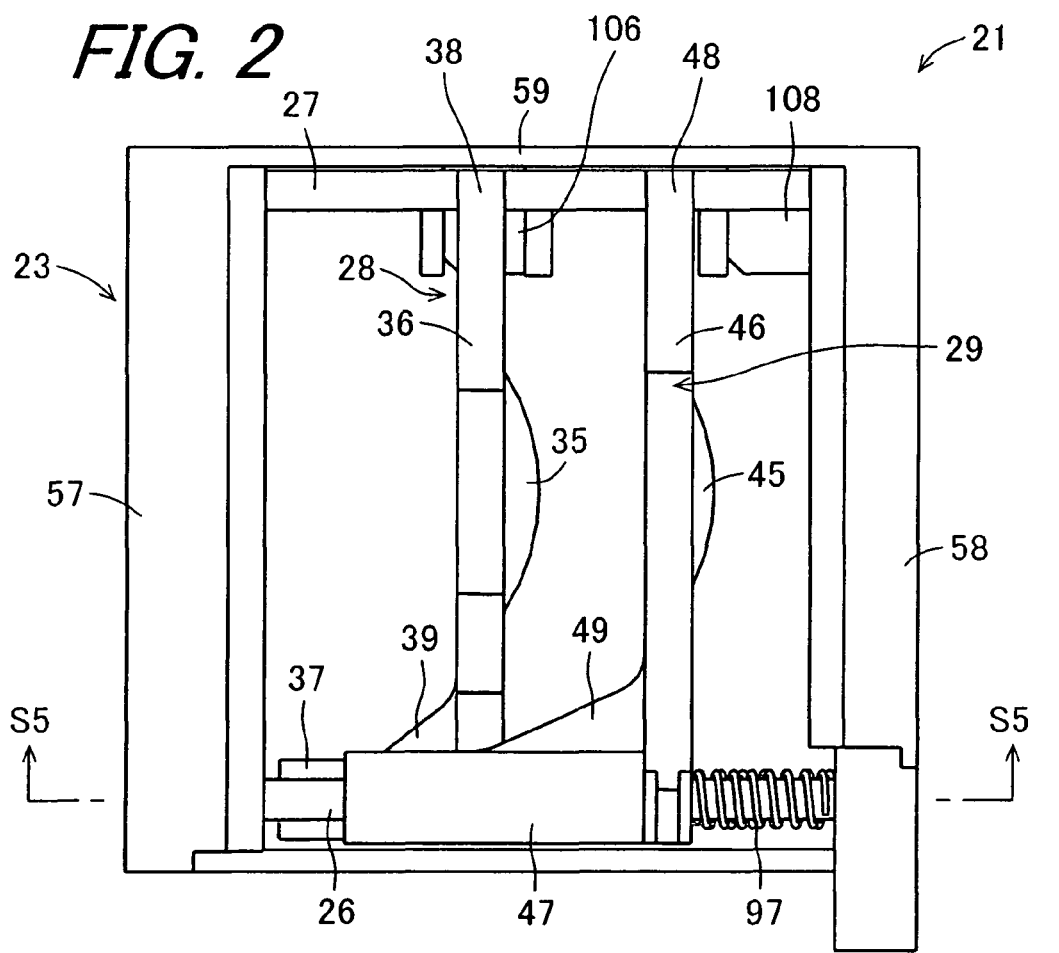
FIG. 2
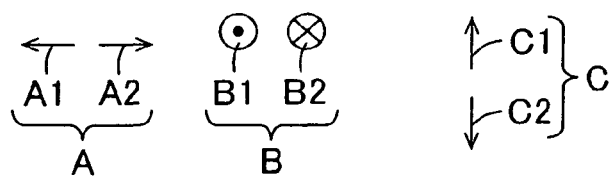

FIG. 9
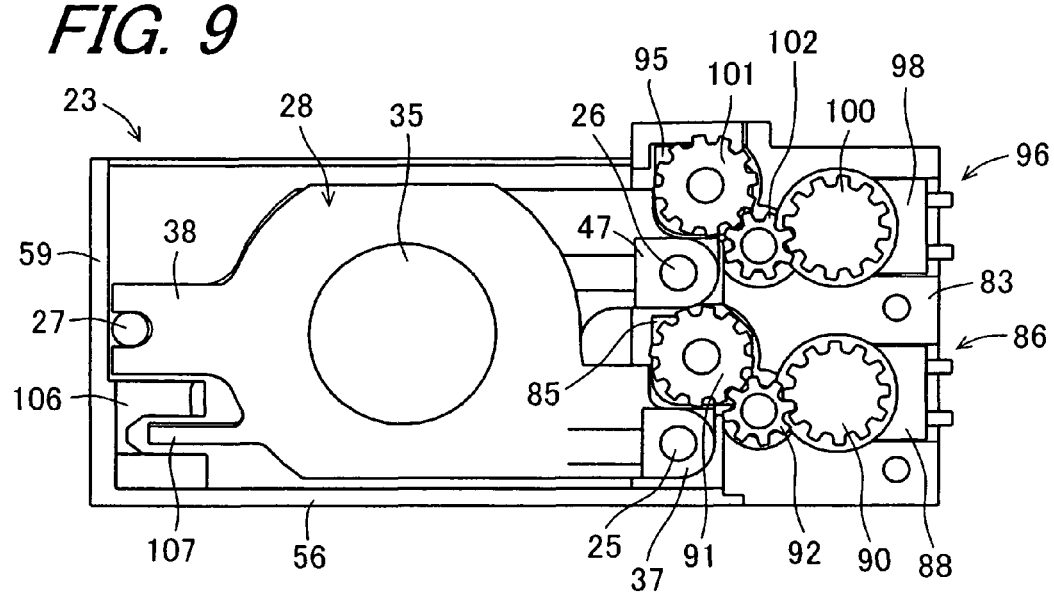
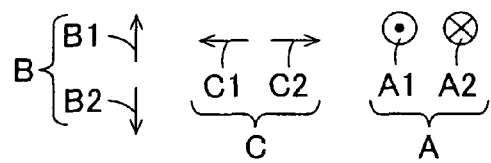

LENS UNIT AND LENS DRIVING APPARATUS

TECHNICAL FIELD

The present invention relates to a lens unit for displacing a lens.

Further, the present invention relates to a lens driving apparatus including the lens unit.

BACKGROUND ART

In an imaging apparatus, a plurality of lenses are coaxially provided, and when any of the respective lenses is displaced in optical directions thereof, an optical zoom is achieved. Later-described first to fifth conventional arts are well known as a technique for displacing a lens.

The first conventional art is disclosed in Japanese Unexamined Patent Publication JP-A 2001-242366. In the first conventional art, a screw rod which rotates by means of an electromagnetic motor; and a guide shaft are arranged in parallel with each other. A lens holder has a holding portion which holds a lens, and a threaded portion into which the screw rod is inserted and threadably engaged. The lens holder is configured so that rotation about the screw rod is controlled by the guide shaft. When the screw rod rotates by means of the electromagnetic motor, the lens holder is displaced along the screw rod.

In the first conventional art as just described, the lens holder maintains a posture thereof with the aid of the screw rod and the guide shaft. In the case where the screw rod contributes to maintenance of the posture of the lens holder as above, friction resistance between the screw rod and the threaded portion becomes larger. The increase in the friction resistance between the screw rod and the threaded portion impedes the rotation of the screw rod or stops the rotation of the screw rod. Accordingly, the first conventional art as above has such a problem that the lens held by the lens holder cannot be displaced smoothly. Further, a driving force-transmitting member such as the screw rod or a stick member coupled to a piezoelectric element requires allowance relative to a member for positioning or guiding the driving force-transmitting member. It is therefore difficult to maintain the posture of the lens holder with high accuracy in the case where the driving force-transmitting member contributes to the maintenance of the posture of the lens holder.

FIG. 12 is a perspective view schematically showing a configuration of a lens unit of the second conventional art. In the second conventional art, a first guide member 1 and a second guide member 2 are arranged in parallel with each other.

A first lens holder 3 has a first holding portion 5 which holds a first lens 4; a first main sliding portion 6; and a first sub sliding portion 7. The first lens holder 3 is provided so as to be displaceable along the first and second guide members 1 and 2, as being guided by the first guide member 1 at the first main sliding portion 6 and guided by the second guide member 2 at the first sub sliding portion 7.

The second lens holder 8 has a second holding portion 10 which holds a second lens 9 coaxially with the first lens 4; a second main sliding portion 11; and a second sub sliding portion 12. The second lens holder 8 is provided so as to be displaceable along the first and second guide members 1 and 2, as being guided by the first guide member 1 at the second main sliding portion 11 and guided by the second guide member 2 at the second sub sliding portion 12.

In the second conventional art, the first main sliding portion 6 is formed so as to extend along the first guide member 1 in order to slide the first main sliding portion 6 smoothly on the first guide member 1. The first main sliding portion 6 becomes more balanced and therefore slides more easily as being longer along the first guide member 1. Moreover, the second main sliding portion 11 is formed so as to extend along the first guide member 1 in order to slide the second main sliding portion 11 smoothly on the second guide member 2. The second main sliding portion 11 becomes more balanced and therefore slides more easily as being longer along the first guide member 1. The second main sliding portion 11 is provided so as to protrude on a first holding portion 5-side relative to the second lens 9.

In the second conventional art as above, the first main sliding portion 6 and the second main sliding portion 11 are guided by a guide member in common and moreover, the second main sliding portion 11 protrudes on the first holding portion 5-side relative to the second lens 9. Accordingly, the first main sliding portion 6 and the second main sliding portion 11 undesirably interfere with each other when the first lens 4 and the second lens 9 are brought close to each other, causing a problem that the first lens 4 and the second lens 9 cannot be sufficiently close to each other.

FIG. 13 is a perspective view schematically showing a configuration of a lens unit of the third conventional art. FIG. 14 is a side view seen in an arrow 15 direction in FIG. 13. The lens unit of the third conventional art is similar to the lens unit of the second conventional art and therefore, the same parts will be denoted by the same symbols to omit descriptions thereof.

In the third conventional art, the first main sliding portion 6 is provided so as to protrude on a side opposite to the second holding portion 10 relative to the first lens 4, and the second main sliding portion 11 is provided so as to protrude on a side opposite to the first holding portion 5 relative to the second lens 9. Both ends of the first guide member 1 and both ends of the second guide member 2 are fixed to a housing 16.

In the third conventional art as above, the first main sliding portion 6 is provided so as to protrude on the side opposite to the second holding portion 10 relative to the first lens 4, and the second main sliding portion 11 is provided so as to protrude on the side opposite to the first holding portion 5 relative to the second lens 9. Accordingly, the first main sliding portion 6 and the housing 16 undesirably interfere with each other and the second main sliding portion 11 and the housing 16 undesirably interfere with each other when the first lens 4 and the second lens 9 are brought away from each other, causing a problem that the first lens 4 and the second lens 9 cannot be sufficiently away from each other.

The fourth conventional art is disclosed in the Japanese Unexamined Patent Publication JP-A 2002-131611. In the fourth conventional art, first to third guide shafts are arranged in parallel with each other. A first movable lens frame has a first holding portion which holds a first lens; a first guide bush portion which slides on the first guide shaft; and a first rotation stop portion which slides on the second guide shaft. A second movable lens frame has a second holding portion which holds a second lens; a second guide bush portion which slides on the second guide shaft; and a second rotation stop portion which slides on the third guide shaft. The first guide bush portion protrudes on a second holding portion-side relative to the first lens. The second guide bush portion protrudes on a first holding portion-side relative to the second lens.

In the fourth conventional art as above, the second guide bush portion and the first rotation stop portion slide on the guide shaft in common and moreover, the second guide bush portion protrudes on the first holding portion-side relative to the second lens. Accordingly, the second guide bush portion and the first rotation stop portion undesirably interfere with each other when the first lens and the second lens are brought close to each other, causing a problem that the first lens 4 and the second lens 9 cannot be sufficiently close to each other.

The fifth conventional art is disclosed in the Japanese Unexamined Patent Publication JP-A 2002-131611 as in the case of the fourth conventional art. In the fifth conventional art, first to fourth guide shafts are arranged in parallel with each other. A first movable lens frame has a first holding portion which holds a first lens; a first guide bush portion which slides on the first guide shaft; and a first rotation stop portion which slides on the second guide shaft. A second movable lens frame has a second holding portion which holds a second lens; a second guide bush portion which slides on the third guide shaft; and a second rotation stop portion which slides on the fourth guide shaft. The first guide bush portion protrudes on a second holding portion-side relative to the first lens. The second guide bush portion protrudes on a first holding portion-side relative to the second lens.

The fifth conventional art as above can solve the problem of the fourth conventional art, but has a problem that mounting errors for respective guide shafts accumulate to decrease positioning accuracy of the lenses since the first guide bush portion and the second guide portion slide on the different guide shafts and in addition, the first rotation stop portion and the second rotation stop portion slide on the different guide shafts.

DISCLOSURE OF INVENTION

An object of the invention is to provide a lens unit and a lens driving apparatus, which enable lenses to be displaced smoothly without increasing restriction with respect to distance between the lenses and moreover, prevent positioning accuracy of the lenses from decreasing.

The invention provides a lens unit comprising:
a first guide member having a first axis line;
a second guide member having a second axis line parallel to the first axis line; and
a third guide member having a third axis line parallel to the first and second axis lines,
the lens unit comprising:
a first lens holder having a first main sliding portion which is guided by sliding on the first guide member, and a first sub sliding portion which is guided by sliding on the third guide member and smaller than the first main sliding portion as viewed along the first axis line; and
a second lens holder having a second main sliding portion which is guided by sliding on the second guide member, and a second sub sliding portion which is guided by sliding on the third guide member and smaller than the second main sliding portion as viewed along the second axis line.

Further, in the invention, it is preferable that the first main sliding portion is provided so as to protrude on a second holding portion-side relative to a first lens.

Further, in the invention, it is preferable that the second main sliding portion is disposed so as to protrude on a first holding portion-side relative to a second lens.

Further, in the invention, it is preferable that the first lens holder further includes a first reinforcing portion which reinforces a connecting part between the first main sliding portion and the first holding portion.

Further, in the invention, it is preferable that the second lens holder further includes a second reinforcing portion which reinforces a connecting part between the second main sliding portion and the second holding portion.

Further, in the invention, it is preferable that the first and second guide members are coupled to a member in common.

Further, in the invention, it is preferable that an area of the first main sliding portion region is smaller than an area of the first holding portion region in a case where the first lens holder is vertically projected to a surface perpendicular to the first axis line.

Further, in the invention, it is preferable that an area of the second main sliding portion region is smaller than an area of the second holding portion region in a case where the second lens holder is vertically projected to a surface perpendicular to the second axis line.

Further, in the invention, it is preferable that:
the first guide member is formed to be columnar;
the first main sliding portion is formed to be cylindrical into which the first guide member is inserted; and
a dimension in a direction along a first axis line of the first main sliding portion is selected so as to satisfy the following expression:

$$L1 > (D1 \cdot \cos \alpha 1 - d1)/\sin \alpha 1$$

where L1 [m] represents a dimension in a direction along a first axis line of the first main sliding portion, D1 [m] represents an inner diameter of the first main sliding portion, d1 [m] represents an outer diameter of the first guide member, and α1 [rad] represents an inclination tolerance of the first lens holder.

Further, in the invention, it is preferable that:
the second guide member is formed to be columnar;
the second main sliding portion is formed to be cylindrical into which the second guide member is inserted; and
a dimension in a direction along a second axis line of the second main sliding portion is selected so as to satisfy the following expression:

$$L2 > (D2 \cdot \cos \alpha 2 - d2)/\sin \alpha 2$$

where L2 [m] represents a dimension in a direction along a second axis line of the second main sliding portion, D2 [m] represents an inner diameter of the second main sliding portion, d2 [m] represents an outer diameter of the second guide member, and α2 [rad] represents an inclination tolerance of the second lens holder.

Further, the invention provides a lens driving apparatus comprising:
the lens unit mentioned above;
first driving means for driving a first lens holder to be displaced along first and third axis lines; and
second driving means for driving a second lens holder to be displaced along second and third axis lines.

Further, in the invention, it is preferable that the first driving means comprises:
a first pressing piece which is provided so as to be displaceable along the first axis line and which contacts the first lens holder and presses the first lens holder in one direction along the first axis line;
a first driving source which drives the first pressing piece to be displaced along the first axis line; and
first spring force generating means for elastically pressing the first lens holder in another direction along the first axis line.

Further, in the invention, it is preferable that the first spring force generating means is a helical compression spring and externally fitted to a first guide member.

Further, in the invention, it is preferable that a dimension in a direction along a first axis line of a first main sliding portion is selected so as to satisfy the following expression:

$$L1 > 2 \cdot \mu 1 \cdot (F1 \cdot h11 + W1 \cdot h21)/(F1-W1)$$

where L1 [m] represents the dimension in a direction along a first axis line of the first main sliding portion, μ1 represents a static friction coefficient between the first guide member and the first main sliding portion, F1 [N] represents a press force of the first pressing piece in the one direction along the first axis line, h11 [m] represents a distance between a point of application of the press force and the first axis line, h21 [m] represents a distance between the first axis line and the third axis line, and W1 [N] represents sliding resistance between a third guide member and a first sub sliding portion.

Further, in the invention, it is preferable that the second driving means comprises:

a second pressing piece which is provided so as to be displaceable along the second axis line and which contacts the second lens holder and presses the second lens holder in one direction along the second axis line;

a second driving source which drives the second pressing piece to be displaced along the second axis line; and second spring force generating means for elastically pressing the second lens holder in another direction along the second axis line.

Further, in the invention, it is preferable that the second sprig force generating means is a helical compression spring and externally fitted to a second guide member.

Further, in the invention, it is preferable that a dimension in a direction along a second axis line of a second main sliding portion is selected so as to satisfy the following expression:

$$L2 > 2 \cdot \mu 2 \cdot (F2 \cdot h12 + W2 \cdot h22)/(F2-W2)$$

where L2 [m] represents the dimension in a direction along a second axis line of the second main sliding portion, μ2 represents a static friction coefficient between the second guide member and the second main sliding portion, F2 [N] represents a press force of the second pressing piece in the one direction along the second axis line, h12 [m] represents a distance between a point of application of the press force and the second axis line, h22 [m] represents a distance between the second axis line and the third axis line, and W2 [N] represents sliding resistance between a third guide member and a second sub sliding portion.

BRIEF DESCRIPTION OF DRAWINGS

Objects, features, and advantages of the invention will be more explicit from the following detailed description taken with reference to the drawing.

FIG. 2 is a plan view of the lens unit 21.

FIG. 9 is a sectional view of the lens driving apparatus 76.

BEST MODE FOR CARRYING OUT THE INVENTION

Figure 1:
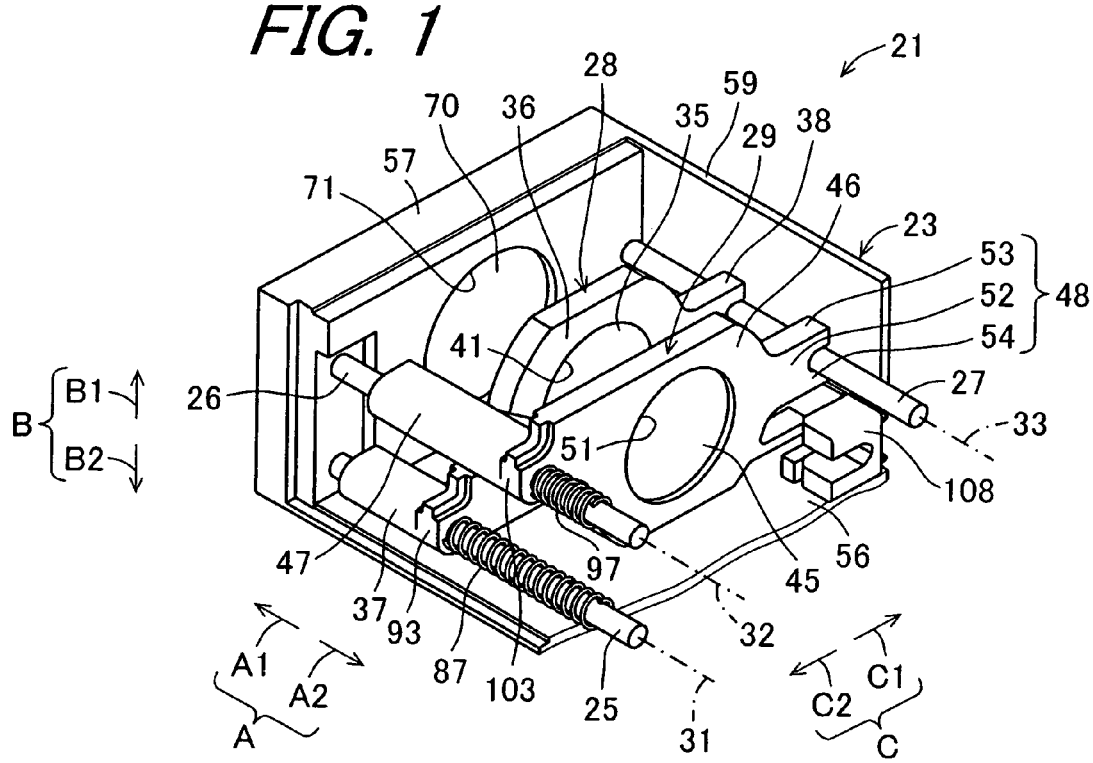
FIG. 1 is a perspective view showing a configuration of a lens unit 21 according to one embodiment of the invention.

Now referring to the drawings, preferred embodiments of the invention are described below.

FIG. 1 is a perspective view showing a configuration of a lens unit 21 according to one embodiment of the invention. FIG. 2 is a plan view of the lens unit 21. In FIG. 1 and FIG. 2, a lid member 22 is omitted. In FIG. 1, a housing 23 is partially cut away.

The lens unit 21 of the present embodiment constitutes a part of an imaging apparatus 24 which is mounted on a mobile device such as a digital camera. The lens unit 21 includes a first guide member 25, a second guide member 26, a third guide member 27, a first lens holder 28, a second lens holder 29, the housing 23, and the lid member 22 (refer to FIG. 4).

The first guide member 25 has a first axis line 31. On the first guide member 25, a first guiding portion is formed which extends along the first axis line 31. The first guiding portion has sections perpendicular to the first axis line 31, of which sections have uniform shapes as viewed along the first axis line 31. In the embodiment, the first guide member 25 is formed into a column, and a middle part between both ends of the first guide member 25 along the first axis line 31 is a first guiding portion.

The second guide member 26 has a second axis line 32 which is parallel to the first axis line 31. On the second guide member 26, a second guiding portion is formed which extends along the second axis line 32. The second guiding portion has sections perpendicular to the second axis line 32, of which sections have uniform shapes as viewed along the second axis line 32. In the embodiment, the second guide member 26 is formed into a column, and a middle part between both ends of the second guide member 26 along the second axis line 32 is a second guiding portion.

The third guide member 27 has a third axis line 33 which is parallel to the first and second axis lines 31 and 32. On the third guide member 27, a third guiding portion is formed which extends along the third axis line 33. The third guiding portion has sections perpendicular to the third axis line 33, of which sections have uniform shapes as viewed along the third axis line 33. In the embodiment, the third guide member 27 is formed into a column, and a middle part between both ends of the third guide member 27 along the third axis line 33 is a third guiding portion.

In the embodiment, the third axis line is located at a position not included in a plane which includes the first and second axis lines 31 and 32. A distance between the first axis line 31 and the third axis line 33 is equal or substantially equal to a distance between the second axis line 32 and the third axis line 33.

In the embodiment, a direction along the first to third axis lines 31 to 33 is referred to as a first direction A. An intersection between a surface perpendicular to the first direction A and the first axis line 31 is defined as a first intersection, an intersection between a surface perpendicular to the first direction A and the second axis line 32 is defined as a second intersection, and an intersection between a surface perpendicular to the first direction A and the third axis line 33 is defined as a third intersection. A direction along a line segment between the first intersection and the second intersection is referred to as a second direction B, a direction from the first intersection toward the second intersection is referred to as one second direction B1, and a direction opposite thereto is referred to as the other second direction B2. Further, a direction along a perpendicular line dropped from the third intersection to the line segment between the first intersection and the second intersection is referred to as a third direction C, a direction from an intersection between the line segment and the perpendicular line toward the third intersection is referred to as one third direction C1, and a direction opposite thereto is referred to as the other third direction C2.

Figure 3:
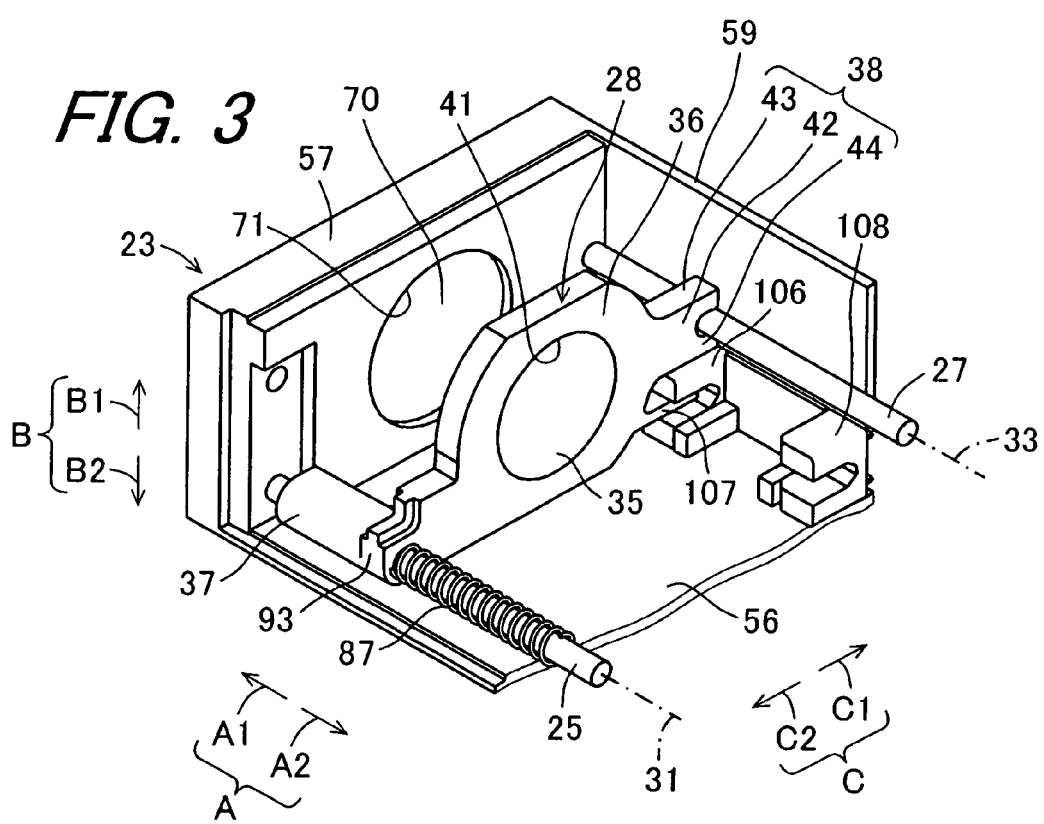
FIG. 3 is a perspective view showing a first lens holder 28.

FIG. 3 is a perspective view showing the first lens holder 28. The first lens holder 28 has a first holding portion 36 which holds a first lens 35; a first main sliding portion 37; a first sub sliding portion 38 which has a smaller dimension than the first main sliding portion 37 as viewed in the first direction A; and a first reinforcing portion 39 (refer to FIG. 2) which reinforces a connecting part between the first main sliding portion 37 and the first holding portion 36. The first lens holder 28 is provided so as to be displaceable in the first direction A in a manner that the first main sliding portion 37 is guided by sliding on the first guide member 25 in a state where the first guide member 25 is inserted into the first main sliding portion 37, and the first sub sliding portion 38 is guided by sliding on the third guide member 27 in a state where the third guide member 27 is inserted into the first sub sliding portion 38.

The first holding portion 36 is interposed between the first guide member 25 and the third guide member 27 as viewed in the third direction C. The first holding portion 36 has a platy shape. The first holding portion 36 has a first through hole 41 pierced in its thickness direction, and the first lens 35 is provided in the first through hole 41. The thickness direction of the first holding portion 36 and a direction of optical axis of the first lens 35 are parallel to the first direction A.

The first main sliding portion 37 bends and thus continues into the first holding portion 36, and extends in the first direction A. The first main sliding portion 37 is formed into a cylinder into which the first guide member 25 is inserted. In the embodiment, the first main sliding portion 37 is provided so as to protrude in the one first direction A1 relative to the first lens 35.

The first sub sliding portion 38 continues into the first holding portion 36. The first sub sliding portion 38 is disposed at the same position as the first holding portion 36 as viewed in the first direction A. The first sub sliding portion 38 is formed into substantially a U-shape as viewed in the first direction A, into which the third guide member 27 is inserted.

The first sub sliding portion 38 includes a first base 42 which continues into the first holding portion 36; one first circumferential contact portion 43 which continues into the first base 42 and contacts the third guide member 27 over one side thereof in a circumferential direction about the first axis line 31; and the other first circumferential contact portion 44 which continues into the first base 42 and contacts the second guide member 26 over the other side thereof in the circumferential direction about the first axis line 31. The first sub sliding portion 38 is open radially outwardly as viewed in a direction of rotation about the first axis line 31, thus being capable of tolerating an error in distance between the first axis line 31 and the third axis line 33.

The first reinforcing portion 39 is achieved by a rib which connects a part of the first holding portion 36 adjacent to the first main sliding portion 37 with a part of the first main sliding portion 37 adjacent to the first holding portion 36. The first reinforcing portion 39 as just described reinforces a connecting part between the first main sliding portion 37 and the first holding portion 36, thus being capable of avoiding a trouble that the first lens holder 28 is undesirably damaged due to the impact upon collision when dropped or at the like occasion.

An area of the first main sliding portion 37 region is smaller than an area of the first holding portion 36 region in the case where the first lens holder 28 is vertically projected to a surface perpendicular to the first direction A. Even when a distance between the first guide member 25 and the second guide member 26 is small, the first lens holder 28 formed as above can prevent a trouble that the first main sliding portion 37 and a later-described second main sliding portion 47 undesirably interfere with each other when the first lens 35 and a second lens 45 are brought close to each other.

Referring back to FIG. 1, the second lens holder 29 has a second holding portion 46 which holds a second lens 45 coaxially with the first lens 35; a second main sliding portion 47; a second sub sliding portion 48 which has a smaller dimension than the second main sliding portion 47 as viewed in the first direction A; and a second reinforcing portion 49 (refer to FIG. 2) which reinforces a connecting part between the second main sliding portion 47 and the second holding portion 46. The second lens holder 29 is provided so as to be displaceable in the first direction A in a manner that the second main sliding portion 47 is guided by sliding on the second guide member 26 in a state where the second guide member 26 is inserted into the second main sliding portion 47, and the second sub sliding portion 48 is guided by sliding on the third guide member 27 in a state where the third guide member 27 is inserted into the second sub sliding portion 48.

The second holding portion 46 is interposed between the second guide member 26 and the third guide member 27 as viewed in the third direction C, and provided in the other first direction A2 relative to the first holding portion 36. The second holding portion 46 has a platy shape. The second holding portion 46 has a second through hole 51 pierced in its thickness direction, and the second lens 45 is provided in the second through hole 51. The thickness direction of the second holding portion 46 and a direction of optical axis of the second lens 45 are parallel to the first direction A.

The second main sliding portion 47 bends and thus continues into the second holding portion 46, and extends in the first direction A. The second main sliding portion 47 is formed into a cylinder into which the second guide member 26 is inserted. In the embodiment, the second main sliding portion 47 is provided so as to protrude in the one first direction A1 relative to the second lens 45.

The second sub sliding portion 48 continues into the second holding portion 46. The second sub sliding portion 48 is disposed at the same position as the second holding portion 46 as viewed in the first direction A. The second sub sliding portion 48 is formed into substantially a U-shape as viewed in the first direction A, into which the third guide member 27 is inserted.

The second sub sliding portion 48 includes a second base 52 which continues into the second holding portion 46; one second circumferential contact portion 53 which continues into the second base 52 and contacts the second guide member 26 over one side thereof in a circumferential direction about the second axis line 32; and the other second circumferential contact portion 54 which continues into the second base 52 and contacts the third guide member 27 over the other side thereof in the circumferential direction about the second axis line 32. The second sub sliding portion 48 is open radially outwardly as viewed in a direction of rotation about the second axis line 32, thus being capable of tolerating an error in distance between the second axis line 32 and the third axis line 33.

The second reinforcing portion 49 is achieved by a rib which connects a part of the second holding portion 46 adjacent to the second main sliding portion 47 with a part of the second main sliding portion 47 adjacent to the second holding portion 46. The second reinforcing portion 49 as just described reinforces a connecting part between the second main sliding portion 47 and the second holding portion 46, thus being capable of avoiding a trouble that the second lens holder 29 is undesirably damaged due to the impact upon collision when dropped or at the like occasion.

An area of the second main sliding portion 47 region is smaller than an area of the second holding portion 46 region in the case where the second lens holder 29 is vertically projected to a surface perpendicular to the first direction A. Even when the distance between the first guide member 25 and the second guide member 26 is small, the second lens holder 29 formed as above can prevent the trouble that the first main sliding portion 37 and the second main sliding portion 47 undesirably interfere with each other when the first lens 35 and the second lens 45 are brought close to each other.

In the embodiment, the first main sliding portion 37 has a first insertion hole into which the first guide member 25 is inserted, and the first sub sliding portion 38 has a first fitting groove in which the third guide member 27 is fitted. Further, the second main sliding portion 47 has a second insertion hole into which the second guide member 26 is inserted, and the second sub sliding portion 48 has a second fitting groove in which the third guide member 27 is fitted.

Inner circumferential surfaces of the first and second insertion holes are formed so as to be slightly larger than outer circumferential surfaces of the first and second guide members 25 and 26 within a range of tolerance, and inner circumferential surfaces of the first and second fitting grooves are formed so as to be slightly larger than an outer circumferential surface of the third guide member 27 within a range of tolerance.

The first and second insertion holes and the first and second fitting grooves are formed as above, with the result that the first lens holder 28 is displaceable in the first direction A in a state where the first guide member 25 is inserted into the first main sliding portion 37 and the third guide member 27 is inserted into the first sub sliding portion 38, and the second lens holder 29 is displaceable in the first direction A in a state where the second guide member 26 is inserted into the second main sliding portion 47 and the third guide member 27 is inserted into the second sub sliding portion 48.

Further, the first and second insertion holes are formed as described above and therefore, when the first and second lens holders 28 and 29 are displaced in the first direction A, the inner circumferential surfaces of the first and second insertion holes are in contact with at least some circumferential parts of regions of the first and second guide members 25 and 26, which regions face ends on an upstream side and on a downstream side in a displacement direction in the respective insertion holes. In the state as above, the first and second main sliding portions 37 and 47 are guided by sliding on the first and second guide members 25 and 26.

Figure 4:
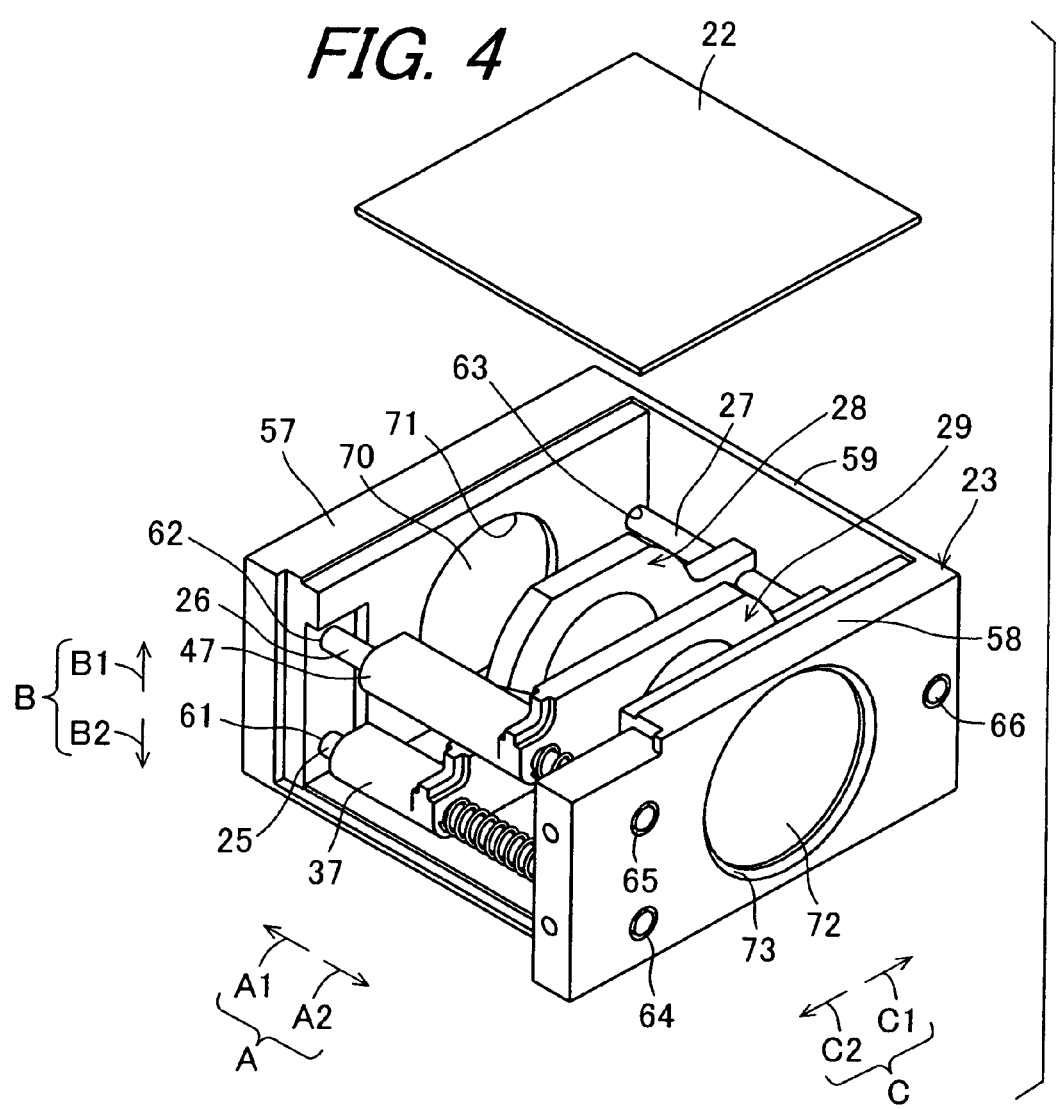
FIG. 4 is a perspective view of the lens unit 21.
Figure 5:
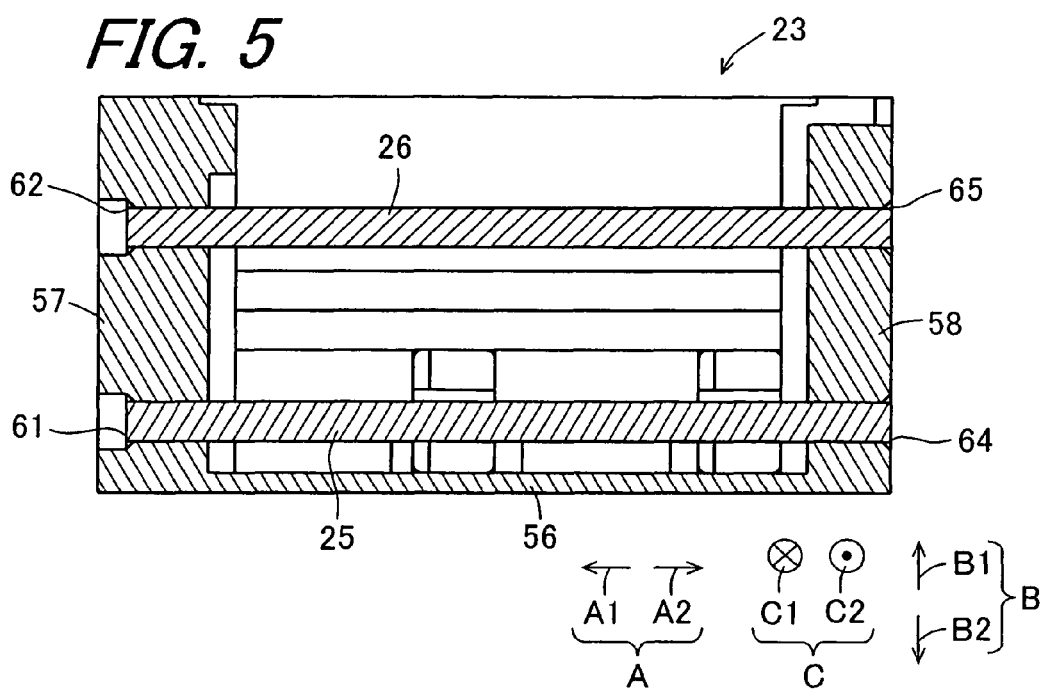
FIG. 5 is a sectional view taken on line S5-S5 in FIG. 2.

FIG. 4 is a perspective view of the lens unit 21. FIG. 5 is a sectional view taken on line S5-S5 in FIG. 2. FIG. 4 shows a state where the lid member 22 is detached. In FIG. 5, the first and second lens holders 28 and 29 are omitted.

The housing 23 includes a bottom portion 56 which is formed into a substantially rectangle plate; a first side wall portion 57 which bends and thus continues into one short-side-wise side part of the bottom portion 56 and which stands on one thickness-wise side of the bottom portion 56; a second side wall portion 58 which bends and thus continues into the other short-side-wise side part of the bottom portion 56 and which stands on one thickness-wise side of the bottom portion 56; and a third side wall-portion 59 which bends and thus continues into one long-side-wise side part of the bottom portion 56. These respective portions 56 to 59 form a housing space. The housing 23 is formed into a single body by using a mold.

Inside the housing 23 as above, the first lens holder 28 and the second lens holder 29 are disposed. The housing 23 is open on a side opposite to the bottom portion 56 and on a side opposite to the third side wall portion 59, therefore resulting in an easy assembling work for the first and second lens holders 28 and 29 and the first to third guide members 25 to 27.

In the embodiment, the first direction A is parallel to a longitudinal direction of the bottom portion 56, the second direction B is parallel to a width direction of the bottom portion 56, and the third direction C is parallel to the width direction of the bottom portion 56.

The bottom portion 56 is disposed in the other second direction B2 relative to the first and second lens holders 28 and 29. The first side wall portion 57 is disposed in the one first direction A1 relative to the first and second lens holders 28 and 29. The second side wall portion 58 is disposed in the other first direction A2 relative to the first and second lens holders 28 and 29. The third side wall portion 59 is disposed in the one third direction C1 relative to the first and second lens holders 28 and 29.

In the first side wall portion 57, three insertion holes 61, 62 and 63 are formed, into each of which one end of each of the first to third guide members 25 to 27 is inserted. The respective insertion holes 61 to 63 formed on the first side wall portion 57 extend in the first direction A and penetrate the first side wall portion 57. In the second side wall portion 58, three insertion holes 64, 65, and 66 are formed, into each of which the other end of each of the first to third guide members 25 to 27 is inserted. The respective insertion holes 64 to 66 formed on the second side wall portion 58 extend in the first direction A and penetrate the first side wall portion 57. The first to third guide members 25 to 27 are pressed into the respective insertion holes 61 to 66 so as to be fixed and coupled thereto.

Since the first to third guide members 25 to 27 are coupled to one member, i.e., the housing 23 as described above, a degree of parallelization is high as compared to the case where the first to third guide members 25 to 27 are coupled to different members. This is because, in the case of being coupled to the different members, an error is generated upon assembling the different members while, in the case of being coupled to the one member, such an error is not generated.

Since the housing 23 is shaped into a single body, relative positions of the insertion holes 61 to 66 can be more accurate by adjusting the mold. By enhancing the accuracy of the relative positions of the respective insertion holes 61 to 66, the degree of parallelization of the first to third guide members 25 to 27 can be enhanced. By enhancing the degree of parallelization of the first to third guide members 25 to 27 as described above, the positioning accuracy of the first and second lenses 35 and 45 can be enhanced even when the first and second main sliding portion 37 and 47 are guided to the different guide members, with the result that a favorable optical property can be obtained.

The first side wall portion 57 holds a third lens 70 coaxially with the first and second lenses 35 and 45. In the first side wall portion 57, a through hole 71 is formed to be pierced in the first direction A, and the third lens 70 is provided in the through hole 71. The second side wall portion 58 holds a fourth lens 72 coaxially with the first and second lenses 35 and 45. In the second side wall portion 58, the through hole 73 is formed to be pierced in the first direction A, and the fourth lens 72 is provided in the through hole 73.

The lid member 22 is formed into a substantially rectangle plate. The lid member 22 covers the first and second lens holders 28 and 29 from a side opposite to the bottom portion 56. The lid member 22 is fixed to the housing 23 with adhesive after the first and second lens holders 28 and 29 and the first to third guide members 25 to 27 have been assembled.

Figure 6:
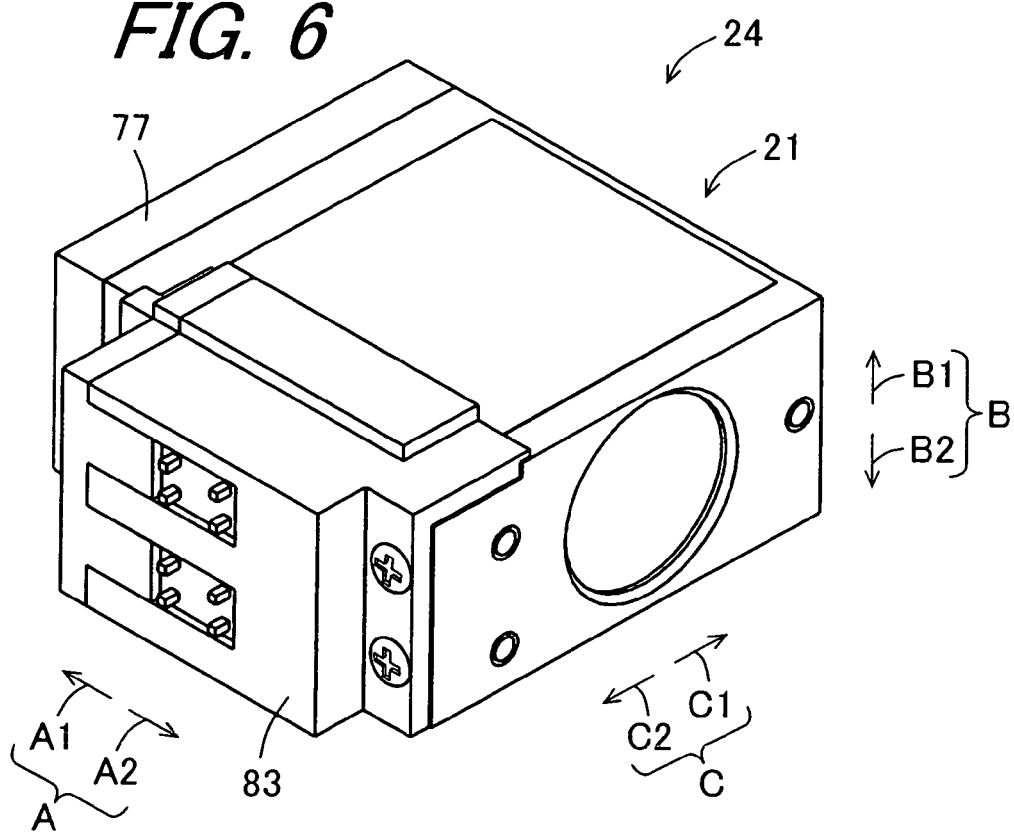
FIG. 6 is a perspective view showing an external appearance of an imaging apparatus 24.
Figure 7:
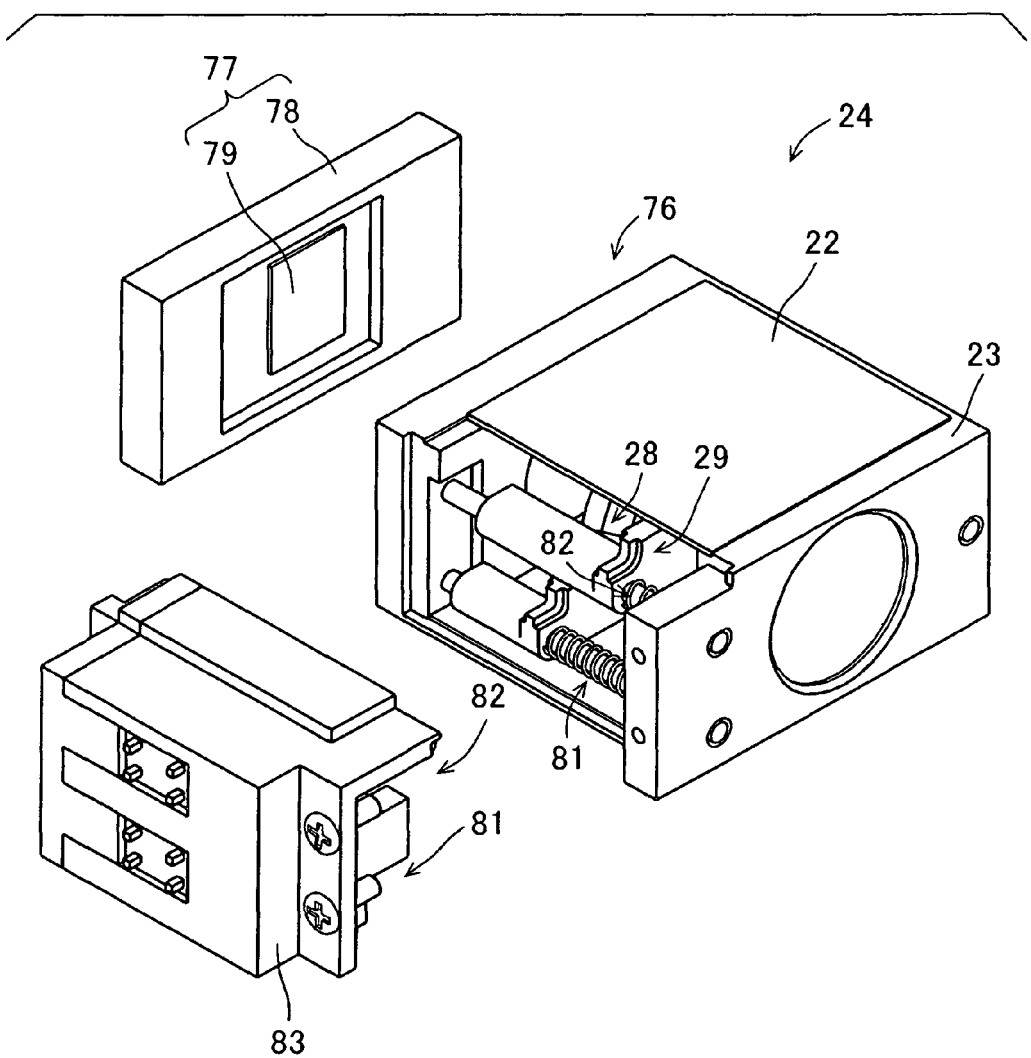
FIG. 7 is an exploded perspective view showing the imaging apparatus 24 in an exploded state.

FIG. 6 is a perspective view showing an external appearance of the imaging apparatus 24. FIG. 7 is an exploded perspective view showing the imaging apparatus 24 in an exploded state. The imaging apparatus 24 includes a lens driving apparatus 76 and an imaging substrate 77.

The imaging substrate 77 includes a platy base material 78 and an imaging element 79 which is provided on one thickness-wise surface portion of the base material 78. The imaging element 79 is achieved by an image sensor using a charge coupled device (abbreviated as CCD), that is, a CCD image sensor. The imaging substrate 77 is fixed in the one first direction A1 to the first side wall portion 57 with adhesive in the state where the imaging element 79 faces the third lens 70.

Figure 8:
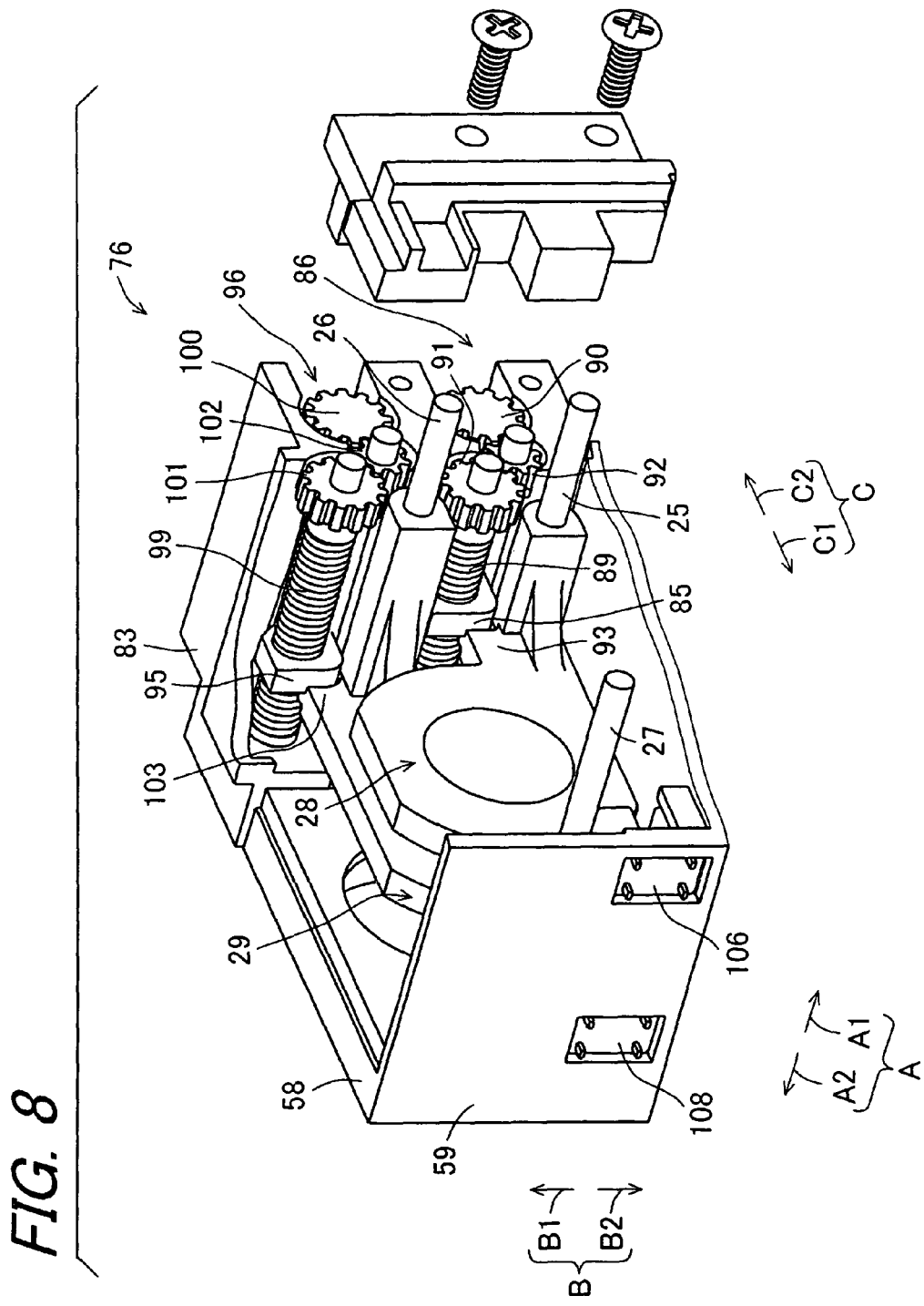
FIG. 8 is a perspective view of a lens driving apparatus 76.

FIG. 8 is a perspective view of the lens driving apparatus 76. FIG. 9 is a sectional view of the lens driving apparatus 76. The lens driving apparatus 76 includes the lens unit 21 shown in FIG. 1 to FIG. 5, first driving means 81 for driving the first lens holder 28 to be driven in the first direction A, and second driving means 82 for driving the second lens holder 29 to be driven in the first direction A.

To the lens unit 21, a support 83 which supports later-described first and second driving sources 86 and 96 is fixed with the aid of a bolt member and adhesive. The support 83 covers the first and second lens holders 28 and 29 from the side opposite to the third side wall portion 59.

The first driving means 81 includes a first pressing piece 85 which is provided so as to be displaceable in the first direction A and which contacts the first lens holder 28 to press the first lens holder 28 in the other first direction A2; the first driving source 86 which drives the first pressing piece 85 to be displaced in the first direction A; and a first helical compression spring 87 serving as first spring force generating means for elastically pressing the first lens holder 28 in the one first direction A1.

The first driving source 86 includes a first motor 88 which is fixed to the support 83; and a first screw shaft 89 which is driven to rotate by the first motor 88. The first motor 88 is achieved by a stepping motor. The use of the stepping motor as the first motor 88 eliminates the need of position detecting means for detecting a position of the first lens holder 28, allowing for decreases in size and cost of the imaging apparatus 24.

An output shaft of the first motor 88 is parallel to the first direction A. The first screw shaft 89 extends in the first direction A and is provided on the support 83 so as to be rotatable about an axis line thereof. The first screw shaft 89 is disposed between the first guide member 25 and the second guide member 26 as viewed in the second direction B.

To the output shaft of the first motor 88, a first input gear 90 is fixed. To one end of the first screw shaft 89, a first output gear 91 is fixed. A first middle gear 92 is interposed between the first input gear 90 and the first output gear 91. The first middle gear 92 is provided on the support 83 so as to be rotatable about an axis line extending in the first direction A. The first middle gear 92 meshes with the first input gear 90 and moreover meshes with the first output gear 91. In the configuration as above, the rotation of the output shaft of the first motor 88 can be transmitted to the screw shaft.

The first lens holder 28 further includes a first engaging portion 93 which engages with the first pressing piece 85. The first engaging portion 93 continues into the first main sliding portion 37. Into the first pressing piece 85, the first screw shaft 89 is threadably engaged and thus inserted. The first engaging portion 93 contacts the first pressing piece 85 in the other first direction A2 and contacts the first pressing piece 85 from both sides in a circumferential direction about an axis line of the first screw shaft 89. Since the first engaging portion 93 contacts the first pressing piece 85 from both sides in the circumferential direction about the axis line of the first screw shaft 89 as just described, the first pressing piece 85 does not rotate even when the first screw shaft 89 rotates. Accordingly, the rotation of the first screw shaft 89 about an axis line thereof displaces the first pressing piece 85 in the first direction A.

The first helical compression spring 87 is externally fitted to the first guide member 25, and interposed between the second side wall portion 58 and the first main sliding portion 37. Since the first helical compression spring 87 is externally fitted to the first guide member 25, it is possible to avoid a trouble that the first helical compression spring 87 undesirably comes off due to an impact upon collision when dropped or at the like occasion. In order to achieve the configuration having the first helical compression spring 87 fitted to the first guide member 25 externally, it is only necessary to insert the first guide member 25 into the first helical compression spring 87, therefore resulting in a favorable assembling property.

In the first driving means 81 as above, the first pressing piece 85 presses the first lens holder 28 in the other first direction A2 while the first helical compression spring 87 presses the first lens holder 28 in the one first direction A1. The first driving source 86 drives the first pressing piece 85 to be displaced in the first direction A, thereby being capable of driving the first lens holder 28 to be displaced in the first direction A. At this time, the first lens holder 28 is pressed in the one first direction A1 by the first helical compression spring 87, thus being allowed to be prevented from jolting when driven to be displaced.

The second driving means 82 includes a second pressing piece 95 which is provided so as to be displaceable in the first direction A and which contacts the second lens holder 29 to press the second lens holder 29 in the other first direction A2; a second driving source 96 which drives the second pressing piece 95 to be displaced in the first direction A; and a second helical compression spring 97 serving as second spring force generating means for elastically pressing the second lens holder 29 in the one first direction A1.

The second driving source 96 includes a second motor 98 which is fixed to the support 83; and a second screw shaft 99 which is driven to rotate by the second motor 98. The second motor 98 is achieved by a stepping motor. The use of the stepping motor as the second motor 98 eliminates the need of position detecting means for detecting a position of the second lens holder 29, allowing for decreases in size and cost of the imaging apparatus 24.

An output shaft of the second motor 89 is parallel to the first direction A. The second screw shaft 99 extends in the first direction A and is provided on the support 83 so as to be rotatable about an axis line thereof. The second screw shaft 99 is disposed in the one second direction B1 relative to the second guide member 26 along the second direction B.

To the output shaft of the second motor 98, a second input gear 100 is fixed. To one end of the second screw shaft 99, a second output gear 101 is fixed. A second middle gear 102 is interposed between the second input gear 100 and the second output gear 101. The second middle gear 102 is provided on the support 83 so as to be rotatable about an axis line extending in the first direction A. The second middle gear 102 meshes with the second input gear 100 and moreover meshes with the second output gear 101. In the configuration as above, the rotation of the output shaft of the second motor 98 can be transmitted to the screw shaft.

The second lens holder 29 further includes a second engaging portion 103 which engages with the second pressing piece 95. The second engaging portion 103 continues into the second main sliding portion 47. Into the second pressing piece 95, the second screw shaft 99 is threadably engaged and thus inserted. The second engaging portion 103 contacts the second pressing piece 95 in the other first direction A2 and contacts the second pressing piece 95 from both sides in a circumferential direction about an axis line of the second screw shaft 99. Since the second engaging portion 103 contacts the second pressing piece 95 from both sides in the circumferential direction about the axis line of the second screw shaft 99 as just described, the second pressing piece 95 does not rotate even when the second screw shaft 99 rotates. Accordingly, the rotation of the second screw shaft 99 about an axis line thereof displaces the second pressing piece 95 in the first direction A.

The second helical compression spring 97 is externally fitted to the second guide member 26, and interposed between the second side wall portion 58 and the second main sliding portion 47. Since the second helical compression spring 97 is externally fitted to the second guide member 26, it is possible to avoid a trouble that the second helical compression spring 97 undesirably comes off due to an impact upon collision when dropped or at the like occasion. In order to achieve the configuration having the second helical compression spring 97 fitted to the second guide member 26 externally, it is only necessary to insert the second guide member 26 into the second helical compression spring 97, therefore resulting in a favorable assembling property.

In the second driving means 82 as above, the second pressing piece 95 presses the second lens holder 29 in the second other direction A2 while the second helical compression spring 97 presses the second lens holder 29 in the one first direction A1. The second driving source 96 drives the second pressing piece 95 to be displaced in the first direction A, thereby being capable of driving the second lens holder 29 to be displaced in the first direction A. At this time, the second lens holder 29 is pressed in the one first direction A1 by the second helical compression spring 97, thus being allowed to be prevented from jolting when driven to be displaced.

At an origin position of the first lens holder 28 when driven, a first origin sensor 106 is disposed. The first origin sensor 106 is fixed to the housing 23. The first origin sensor 106 is achieved by a photo interrupter which contains a light-emitting element and a light-receiving element. The first lens holder 28 further includes a first light-shielding portion 107 which continues into the first holding portion 36. When the first lens holder 28 is displaced to the origin position, light emitted from the light-emitting element is shielded by the first light-shielding portion 107. The first origin sensor 106 outputs signals different from a light-shielded state to a no-light-shielded state. By using the signal emitted from the first origin sensor 106, it is possible to detect that the first lens holder 28 has been displaced to the origin position.

At an origin position of the second lens holder 29 when driven, a second origin sensor 108 is disposed. The second origin sensor 108 is fixed to the housing 23. The second origin sensor 108 is achieved by a photo interrupter which contains a light-emitting element and a light-receiving element. The second lens holder 29 further includes a second light-shielding portion 109 which continues into the second holding portion 46. When the second lens holder 29 is displaced to the origin position, light emitted from the light-emitting element is shielded by the second light-shielding portion 109. The second origin sensor 108 outputs signals different from a light-shielded state to a no-light-shielded state. By using the signal emitted from the second origin sensor 108, it is possible to detect that the second lens holder 29 has been displaced to the origin position.

In the lens driving apparatus 76 as above, the first driving means 81 drives the first lens holder 28 to be displaced in the first direction A, and the second driving means 82 drives the second lens holder 29 to be displaced in the first direction A, whereby a distance between the first lens 35 and the second lens 45 can be made to change with the respective lenses 35 and 45 having an optical axis in common.

Figure 10:
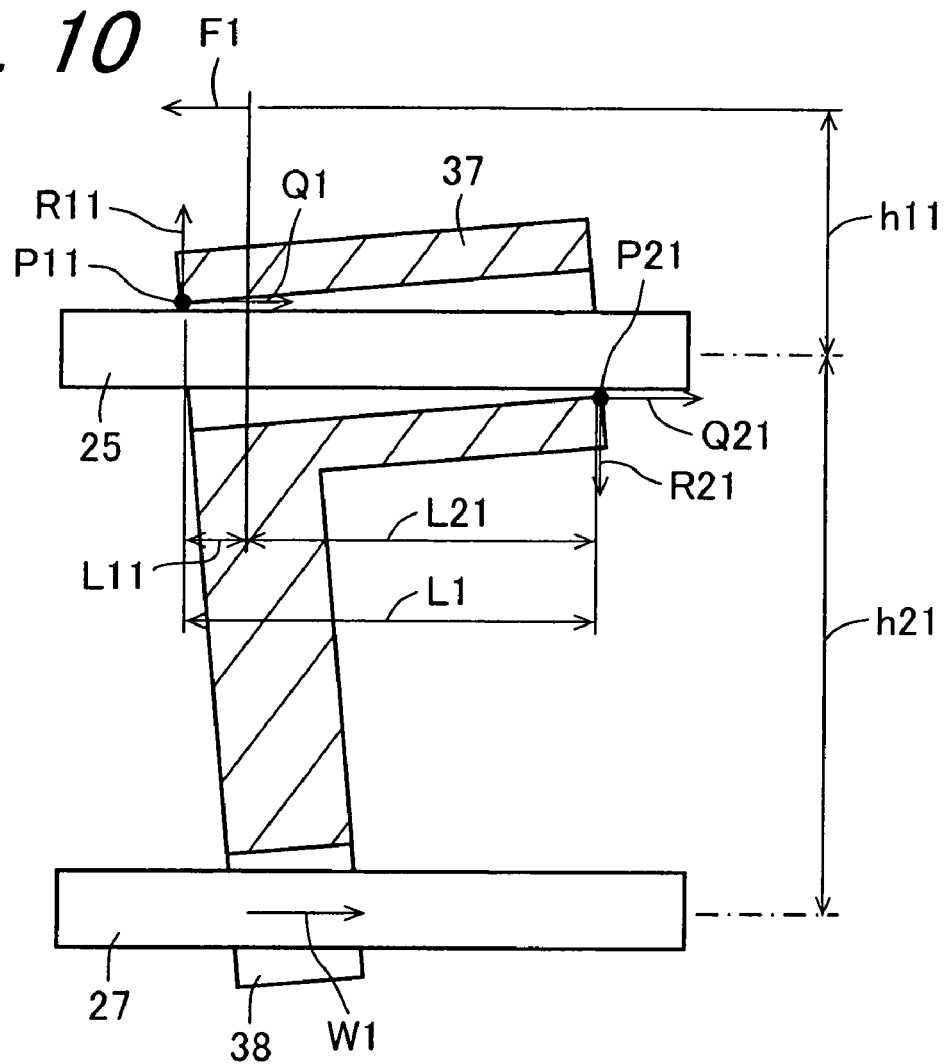
FIG. 10 is an enlarged view schematically showing a first main sliding portion 37 and a first sub sliding portion 38.

FIG. 10 is an enlarged view schematically showing the first main sliding portion 37 and the first sub sliding portion 38. Now, a dimension of the first main sliding portion 37 as viewed in the first direction A is represented by L1 [m], a static friction coefficient between the first guide member 25 and the first main sliding portion 37 is represented by $\mu 1$, a press force of the first pressing piece 85 in the one first direction A1 is represented by F1 [N], a distance between a point of application of the press force and the first axis line 31 is represented by h11 [m], a distance between the first axis line 31 and the third axis line 33 is represented by h21 [m], and sliding resistance between the third guide member 27 and the first sub sliding portion 38 is represented by W1 [N]. Further, an inner diameter of the first main sliding portion 37 is represented by D1 [m].

A contact point between the first main sliding portion 37 and the first guide member 25 as viewed in the other first direction A2 is represented by a first contact point P11, and a contact point between the first main sliding portion 37 and the first guide member 25 as viewed in the one first direction A1 is represented by a second contact point P21, and in this case, a distance between the first contact point P11 and the point of application of the press force as viewed in the first direction A is represented by L11, a distance between the second contact point P21 and the point of application of the press force as viewed in the first direction A is represented by L21, and a distance between the first contact point P11 and the second contact point P21 as viewed in the first direction A is represented by L1. Normal force applied to the first contact point P11 is represented by R11 [N], and normal force applied to the second contact point P21 is represented by R21 [N]. Frictional force generated on the first contact point P11 is represented by $Q11 = \mu 1 \cdot R11$, and frictional force generated on the second contact point P21 is represented by $Q21 = \mu 1 \cdot R21$.

The following expressions (1)-(3) are satisfied for sliding the first main sliding portion 37.

$$F1 \cdot h11 + W1 \cdot h21 - R11 \cdot L11 - R21 \cdot L21 - Q11 \cdot (D1/2) + Q21 \cdot (D1/2) = 0 \qquad (1)$$

$$R11 = R21 = R1 \qquad (2)$$

$$F1 > Q11 + Q21 + W1 \qquad (3)$$

The following expression (4) is derived from the above expressions (1)-(3).

$$L1 > 2 \cdot \mu 1 \cdot (F1 \cdot h11 + W1 \cdot h21)/(F1 - W1) \qquad (4)$$

The following expression (5) is satisfied where the sliding resistance between the third guide member 27 and the first sub sliding portion 38 is defined as W1=0 for simplicity.

$$0.5 > \mu 1 \cdot h11/L1 \quad (5)$$

In the case where the dimension L1 of the first main sliding portion 37 as viewed in the first direction A is small, the expression (5) is not satisfied. This means that, in the case where the dimension L1 of the first main sliding portion 37 as viewed in the first direction A is small, large frictional force is generated on the first and second contact points P11 and P21, resulting in deterioration of the sliding property of the first main sliding portion 37.

In the case where the distance h11 between the point of application of the press force and the first axis line 31 is large, the expression (5) is not satisfied either. This means that the principle of leverage increases the normal forces R11 and R21 applied to the first and second contact points P11 and P21, thereby increasing the fictional force Q11 and Q21 generated on the first and second contacts P11 and P21, resulting in deterioration of the sliding property of the first main sliding portion 37. In view of the above point, the distance h11 between the point of application of the press force and the first axis line 31 should be small. Further, it is obvious that the first main sliding portion 37 is slid more easily with a smaller static friction coefficient $\mu 1$.

The static friction coefficient $\mu 1$ changes to a large extent depending on a material, a usage environment, and an environment for mass production, therefore being hard to be precisely measured and about 0.2 to 0.6 between resin and stainless steel. The distance h11 between the point of application of the press force and the first axis line 31 needs to be at least about 1.5 mm in consideration of an outer diameter of the first guide member 25 and a thickness of the first main sliding portion 37. On the basis of the above, it is the most effective to increase the dimension L1 of the first main sliding portion 37 as viewed in the first direction A in order to enhance the sliding property of the first main sliding portion 37. In view of this point, the dimension of the first main sliding portion 37 as viewed along the first axis line 31 is selected so as to satisfy the expression (5) in the embodiment. An upper limit of the dimension of the first main sliding portion 37 as viewed along the first axis line 31 is selected at such a value that the first main sliding portion 37 can slide on the first guide member 25 inside the housing 23.

The dimension L1 of the first main sliding portion 37 as viewed along the first axis line 31 is selected so as to satisfy $L1 > 2 \cdot \mu 1 \cdot (F1 \cdot h11 + W1 \cdot h21)/(F1 - W1)$, with the result that the sliding resistance between the first main sliding portion 37 and the first guide member 25 is sufficiently small, allowing the first lens 35 to be smoothly displaced.

The dimension of the second main sliding portion 47 as viewed along the second axis line 32 is similar to the above dimension of the first main sliding portion 37 as viewed along the first axis line 31 and therefore explained briefly. A dimension of the second main sliding portion 47 as viewed along the first direction A is represented by L2 [m], a static friction coefficient between the second guide member 26 and the second main sliding portion 47 is represented by $\mu 2$, a press force of the second pressing piece 95 in the one first direction A1 is represented by F2 [N], a distance between the point of application of the press force and the second axis line 32 is represented by h12 [m], a distance between the second axis line 32 and the third axis line 33 is represented by h22 [m], and sliding resistance between the third guide member 27 and the second sub sliding portion 48 is represented by W2 [N] and in this case, the dimension of the second main sliding portion 47 as viewed along the second axis line 32 is selected so as to satisfy the following expression.

$$L2 > 2 \cdot \mu 2 \cdot (F2 \cdot h12 + W2 \cdot h22)/(F2 - W2) \quad (6)$$

An upper limit of the dimension of the second main sliding portion 47 as viewed along the second axis line 32 is selected at such a value that the second main sliding portion 47 can slide on the second guide member 26 inside the housing 23.

The dimension L2 of the second main sliding portion 47 as viewed in the first direction A is selected so as to satisfy $L2 > 2 \cdot \mu 2 \quad (F2 \cdot h12 + W2 \cdot h22)/(F2 - W2)$, with the result that the sliding resistance between the second main sliding portion 47 and the second guide member 26 is sufficiently small, allowing the second lens 45 to be smoothly displaced.

Figure 11:
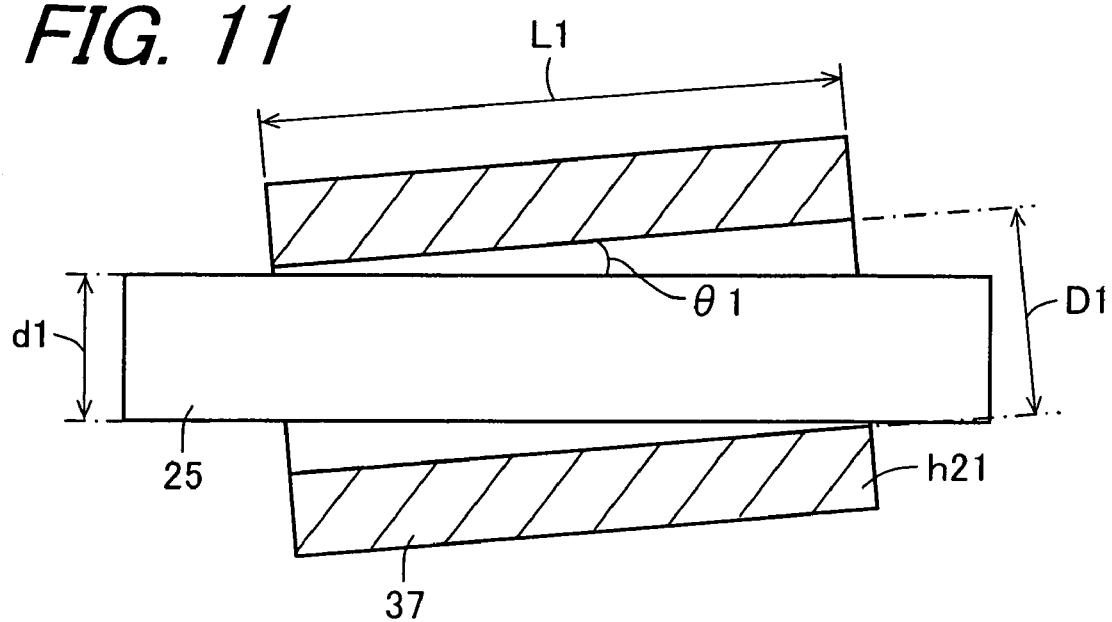
FIG. 11 is an enlarged view schematically showing the first main sliding portion 37.
Figure 12:
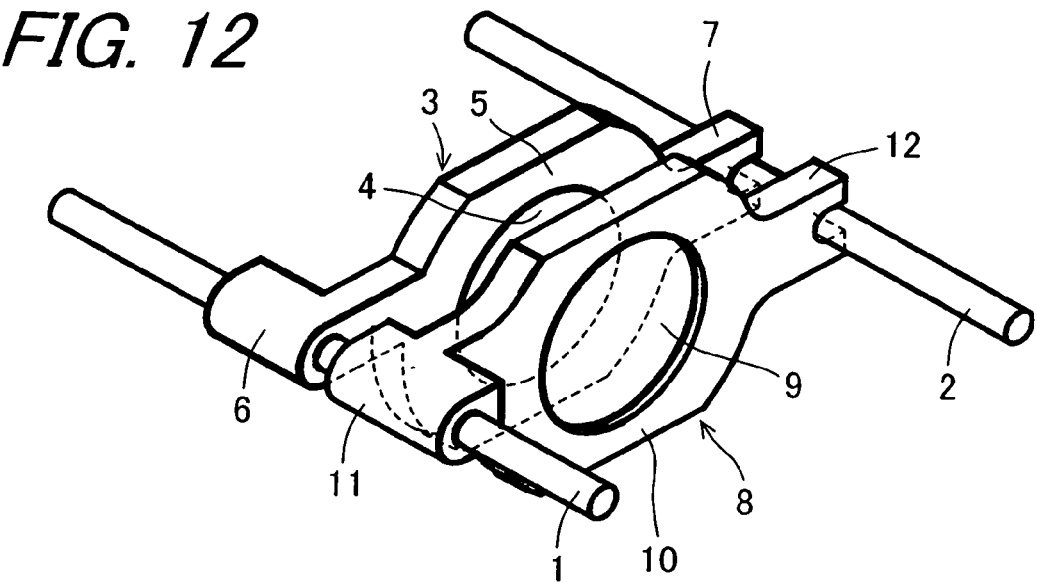
FIG. 12 is a perspective view schematically showing a configuration of a lens unit of a second conventional art.
Figure 13:
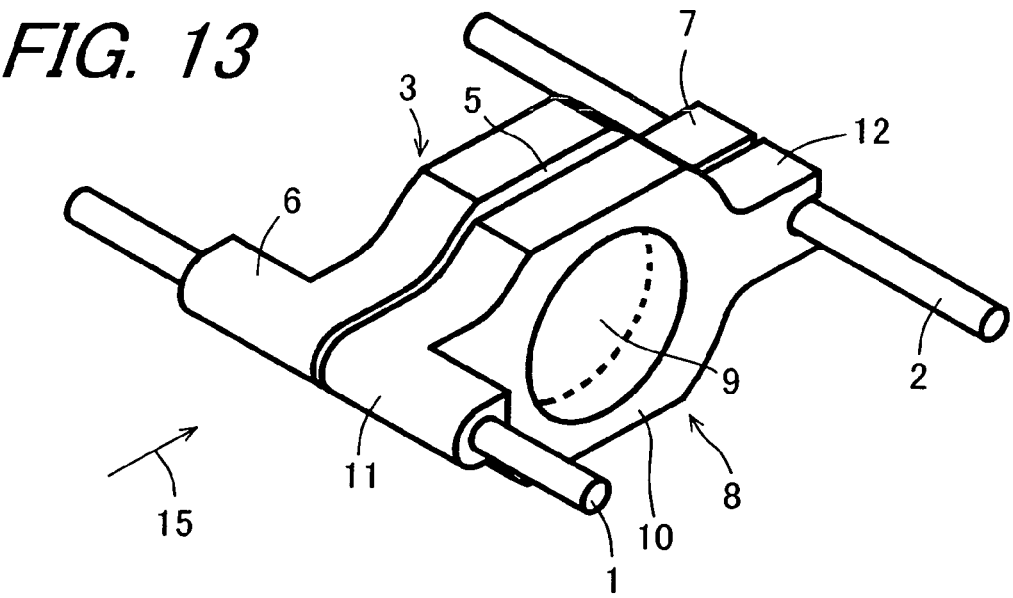
FIG. 13 is a perspective view schematically showing a configuration of a lens unit of a third conventional art.
Figure 14:
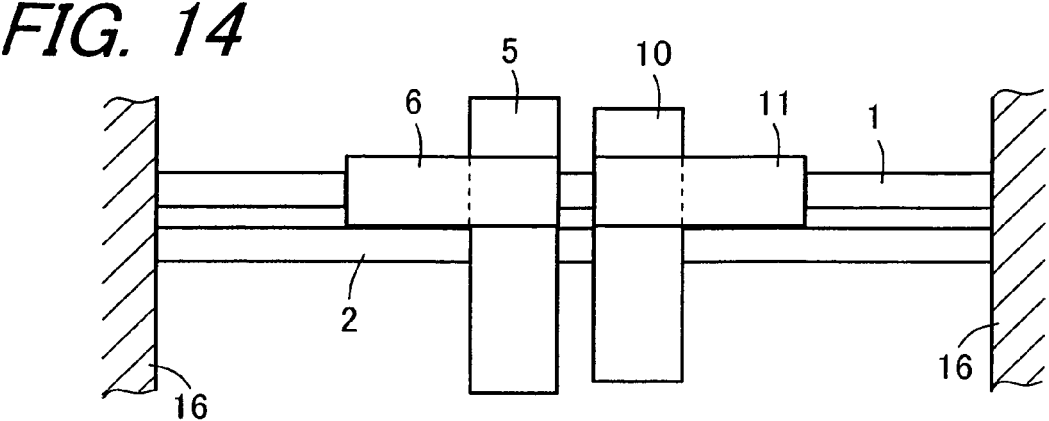
FIG. 14 is a side view seen in an arrow 15 direction in FIG. 13.

FIG. 11 is an enlarged view schematically showing the first main sliding portion 37. The inner diameter of the first main sliding portion 37 is larger than the outer diameter of the first guide member 25 by about several tens of µm. This aims to prevent the inner diameter of the first main sliding portion 37 from decreasing to a level smaller than the outer diameter of the first guide member 25 when deformed by a temperature change and thus prevent the first main sliding portion 37 from stop sliding on the first guide member 25. A tiny gap between the first main sliding portion 37 and the first guide member 25 causes the first lens holder 28 to be inclined during the sliding movement. In order to less incline the first lens holder 28, the dimension of the first main sliding portion 37 as viewed along the first axis line 31 is set to be large.

Now, the dimension of the first main sliding portion 37 as viewed in the first direction A is represented by L1 [m], the inner diameter of the first main sliding portion 37 is represented by D1 [m], the outer diameter of the first guide member 25 is represented by d1 [m], an inclination tolerance of the first lens holder 28 is represented by $\alpha 1$ [rad], and inclination of the first lens holder 28 is represented by $\theta 1$ [rad] ($0 < \theta 1 < \alpha 1 < \pi/2$). In this case, the following expression (7) is satisfied.

$$L1 \cdot \tan \theta 1 + d1/\cos \theta 1 = D1 \quad (7)$$

The expression (7) is then rewritten to:

$$L1(\theta 1) = (D1 \cdot \cos \theta 1 - d1)/\sin \theta 1 \quad (8)$$

Since $L1(\theta 1)$ is monotonically decreasing function within a range of $0 < \theta < \pi/2$, it is only necessary to satisfy $L1(\theta 1) > L1 (\alpha 1)$ in order to satisfy $\theta < \alpha$. That is to say, if the following expression (9) is satisfied, the inclination of the first lens holder 28 becomes a tolerance, i.e., $\alpha 1$ [rad] or less so that an optical property can be maintained.

$$L1 = (D1 \cdot \cos \alpha 1 - d1)/\sin \alpha 1 \quad (9)$$

In view of this point, the dimension of the first main sliding portion 37 as viewed along the first axis line 31 is selected so as to satisfy the expression (9) in the embodiment. The upper limit of the dimension of the first main sliding portion 37 as viewed along the first axis line 31 is selected at such a value that the first main sliding portion 37 can slide on the first guide member 25 inside the housing 23.

The dimension L1 of the first main sliding portion 37 as viewed along the first axis line 31 is selected so as to satisfy $L1 > D1 \cdot \cos \alpha 1 - d1)/\sin \alpha 1$, with the result that the first lens 35 is inclined within the tolerable range, thus allowing for a favorable optical property.

The dimension of the second main sliding portion 47 as viewed along the second axis line 32 is similar to the above dimension of the first main sliding portion 37 as viewed along the first axis line 31 and therefore explained briefly. The dimension of the second main sliding portion 47 as viewed along the first direction A is represented by L2 [m], an inner diameter of the second main sliding portion 47 is represented by D2 [m], an outer diameter of the second guide member 26 is represented by d2 [m], and an inclination tolerance of the second lens holder 29 is represented by α2 [rad] and in this case, the dimension of the second main sliding portion 47 as viewed along the second axis line 32 is selected so as to satisfy the following expression.

$$L2 > (D2 \cdot \cos \alpha 2 - d2)/\sin \alpha 2 \quad (10)$$

The upper limit of the dimension of the second main sliding portion 47 as viewed along the second axis line 32 is selected at such a value that the second main sliding portion 47 can slide on the second guide member 26 inside the housing 23.

The dimension L2 of the second main sliding portion 47 as viewed along the second axis line 32 is selected so as to satisfy L2>(D2·cos α2−d2)/sin α2, with the result that the second lens 47 is inclined within the tolerable range, thus allowing for a favorable optical property.

According to the embodiment as above, the first to third guide members 25 to 27 have the first to third axis lines 31 to 33, and the first to third axis lines 31 to 33 are arranged in parallel with each other. The first lens holder 28 has the first lens 35 held by the first lens holding portion 35 with the first main sliding portion 37 guided by sliding on the first guide member 25, and the first sub sliding portion 38 guided by sliding on the third guide member 27, and is provided so as to be displaceable in the first direction A. The second lens holder 29 has the second lens 45 held coaxially with the first lens 35 by the second lens holding portion 45 with the second main sliding portion 47 guided by sliding on the second guide member 26, and the second sub sliding portion 48 guided by sliding on the third guide member 27, and is provided so as to be displaceable in the first direction A. Accordingly, the distance between the first lens 35 and the second lens 45 can be changed with the optical axes of the respective lenses in common.

The first main sliding portion 37 and the second main sliding portion 47 are guided by the different guide members, therefore avoiding a trouble that the first main sliding portion 37 and the second main sliding portion 47 undesirably interfere with each other when the first lens 37 and the second lens 47 are brought close to each other. Moreover, the first sub sliding portion 38 has a smaller dimension than the first main sliding portion 37 as viewed in the first direction A, and the second sub sliding portion 48 has a smaller dimension than the second main sliding portion 47 as viewed in the first direction A, with the result that even with the first sub sliding portion 38 and the second sub sliding portion 48 being guided by the guide member in common, such a trouble is avoided that the first sub sliding portion 38 and the second sub sliding portion 48 undesirably interfere with each other when the first lens 35 and the second lens 45 are brought close to each other. As described above, a trouble of the undesired interference between the first main sliding portion 37 and the second main sliding portion 47 is avoided and in addition, a trouble of the undesired interference between the first sub sliding portion 38 and the second sub sliding portion 48 is avoided, with the result that the first lens 35 and the second lens 45 can be brought sufficiently close to each other.

The first and second lens holders 28 and 29 are driven to be displaced during optical zooming. In the embodiment, it is possible to avoid a trouble that the first main sliding portion 37 and the second main sliding portion 47 undesirably interfere with each other, with the result that the first lens 35 and the second lens 45 can be brought so close to each other as to have an interval of about 0.3 mm, for example. Further, in the embodiment, the second main sliding portion 47 is provided so as to protrude in the one first direction A1 relative to the second lens 45, with the result that the second lens 45 can be brought so close to the fourth lens 72 as to have an interval of about 0.3 mm, for example.

Since the first sub sliding portion 38 and the second sub sliding portion 48 are guided by the guide member in common, an accumulated mounting error for the respective guide members is small, resulting in higher positioning accuracy of the first and second lenses 35 and 45, as compared to the case where the first sub sliding portion 38 and the second sub sliding portion 48 are guided by the different guide members. In addition, since the first sub sliding portion 38 and the second sub sliding portion 48 are guided by the guide member in common, the number of guide members is small, thus facilitating the assembling task of the lens unit 21, as compared to the case where the first sub sliding portion 38 and the second sub sliding portion 48 are guided by the different guide members.

Further, according to the invention, the second main sliding portion 47 is provided so as to protrude on the first holding portion 36-side relative to the second lens 45, with the result that the first lens 35 and the second lens 45 can be brought further away from each other as compared to the case where the second main sliding portion 47 is provided so as to protrude in an opposite direction. In other words, even when the dimension of the second main sliding portion 47 as viewed in the first direction A is selected so as to satisfy the expressions (6) and (10), the housing 23 does not need to be larger, allowing for a decrease in size of the lens unit 21.

Since the first main sliding portion 37 satisfies the expressions (6) and (10), the sliding resistance between the first main sliding portion 37 and the first guide member 25 is small, and the first main sliding portion 37 is restrained from inclining relative to the first guide member 25. The small sliding resistance between the first main sliding portion 37 and the first guide member 25 allows the first lens 35 to be smoothly displaced. Moreover, the restraint on inclination of the first main sliding portion 37 relative to the first guide member 25 allows the optical axis of the first lens 35 to be restrained from inclining.

Since the second main sliding portion 37 satisfies the expressions (6) and (10), the sliding resistance between the second main sliding portion 47 and the second guide member 26 is small, and the second main sliding portion 47 is restrained from inclining relative to the second guide member 26. The small sliding resistance between the second main sliding portion 47 and the second guide member 26 allows the second lens 45 to be smoothly displaced. Moreover, the restraint on inclination of the second main sliding portion 47 relative to the second guide member 26 allows the optical axis of the second lens 45 to be restrained from inclining.

Further, according to the embodiment, the distance between the first axis line 31 and the third axis line 33 is equal or substantially to the distance between the second axis line 32 and the third axis line 33. Accordingly, the positioning accuracy of the first lens holder 28 and the positioning accuracy of the second lens holder 29 can be set at the same level.

The above-described embodiments are merely examples of the invention, and the configurations can be modified within the range of the invention. For example, the first main sliding portion 37 is provided so as to protrude on the second holding portion 46-side relative to the first lens 35, and the second main sliding portion 37 is provided so as to protrude on the first holding portion 36-side relative to the second lens 45. In this case, the first lens 35 and the second lens 45 can be brought further away from each other without increasing the size of the housing 23. Moreover, the first and second driving sources 86 and 96 may be common.

The invention may be embodied in other various forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

According to the invention, the first to third guide members have the first to third axis lines, and the first to third axis lines are arranged in parallel with each other. The first lens holder has the first lens held by the first lens holding portion with the first main sliding portion guided by sliding on the first guide member, and the first sub sliding portion guided by sliding on the third guide member, and is provided so as to be displaceable along the first and third axis lines. The second lens holder has the second lens held coaxially with the first lens by the second lens holding portion with the second main sliding portion guided by sliding on the second guide member, and the second sub sliding portion guided by sliding on the third guide member, and is provided so as to be displaceable along the second and third axis lines. Accordingly, the distance between the first lens and the second lens can be changed with the optical axes of the respective lenses in common.

The first main sliding portion enables the first lens holder to slide along the first axis line and restrains the first lens holder from inclining relative to the first axis line during the sliding movement. The larger the dimension in a direction along a first axis line of the first main sliding portion is, the more effective the first main sliding portion can be restrained from inclining relative to the first guide member. The optical axis of the first lens can be thus restrained from inclining. Moreover, the larger the dimension in a direction along a first axis line is, the smaller the sliding resistance between the first main sliding portion and the first guide member is.

The second main sliding portion enables the second lens holder to slide along the second axis line and restrains the second lens holder from inclining relative to the second axis line during the sliding movement. The larger the dimension in a direction along a second axis line of the second main sliding portion is, the more effective the second main sliding portion can be restrained from inclining relative to the second guide member. The optical axis of the second lens can be thus restrained from inclining. Moreover, the larger the dimension in a direction along a second axis line is, the smaller the sliding resistance between the second main sliding portion and the second guide member is.

The first sub sliding portion slides on the third guide member and prevents the first lens holder from rotating about the first guide member. The dimension in a direction along a first axis line is smaller than that of the first main sliding portion.

The second sub sliding portion slides on the third guide member and prevents the second lens holder from rotating about the second guide member. The dimension in a direction along a second axis line is smaller than that of the second main sliding portion.

The first main sliding portion and the second main sliding portion are guided by the different guide members, therefore avoiding a trouble that the first main sliding portion and the second main sliding portion undesirably interfere with each other when the first lens and the second lens are brought close to each other. Moreover, the first sub sliding portion and the second sub sliding portion are smaller than the first main sliding portion and the second main sliding portion as viewed along the first axis. Accordingly, even with the first sub sliding portion and the second sub sliding portion being guided by the guide member in common, such a trouble is avoided that the first sub sliding portion and the second sub sliding portion undesirably interfere with each other when the first lens and the second lens are brought close to each other. As described above, a trouble of the undesired interference between the first main sliding portion and the second main sliding portion is avoided and in addition, a trouble of the undesired interference between the first sub sliding portion and the second sub sliding portion is avoided, with the result that the first lens and the second lens can be brought sufficiently close to each other.

Since the first sub sliding portion and the second sub sliding portion are guided by the guide member in common, the accumulated mounting error for the respective guide members is small, resulting in higher positioning accuracy of the first and second lenses, as compared to the case where the first sub sliding portion and the second sub sliding portion are guided by the different guide members. In addition, since the first sub sliding portion and the second sub sliding portion are guided by the guide member in common, the number of guide members is small, thus facilitating the assembling task of the lens unit, as compared to the case where the first sub sliding portion and the second sub sliding portion are guided by the different guide members.

According to the invention, the first main sliding portion is provided so as to protrude on the second holding portion-side relative to the first lens, with the result that the first lens and the second lens can be brought further away from each other and moreover, the lens unit can be downsized, as compared to the case where the first main sliding portion is provided so as to protrude in an opposite direction.

According to the invention, the second main sliding portion is provided so as to protrude on the first holding portion-side relative to the second lens, with the result that the first lens and the second lens can be brought further away from each other and moreover, the lens unit can be downsized, as compared to the case where the second main sliding portion is provided so as to protrude in an opposite direction.

According to the invention, the first reinforcing portion reinforces the connecting part between the first main sliding portion and the first holding portion, thus being capable of avoiding the trouble that the first lens holder is undesirably damaged due to the impact upon collision when dropped or at the like occasion.

According to the invention, the second reinforcing portion reinforces the connecting part between the second main sliding portion and the second holding portion, thus being capable of avoiding the trouble that the second lens holder is undesirably damaged due to the impact upon collision when dropped or at the like occasion.

According to the invention, the first and second guide members are coupled to the member in common, with the result that the first and second guide members have a high degree of parallelization as compared to the case where the first and second guide members are coupled to the different members. This is because errors are generated in assembling the different members in the case where the first and second guide members are coupled to the different members while no such error is generated in the case where the first and second guide members are coupled to the member in common. When the degree of parallelization between the first and second guide members becomes higher, the positioning accuracy of the first and second lenses is enhanced.

According to the invention, the area of the first main sliding portion region is smaller than the area of the first holding portion region in the case of being vertically projected to the surface perpendicular to the first axis line, with the result that even when the distance between the first guide member and the second guide member is small, such a trouble can be avoided that the first main sliding portion and the second main sliding portion undesirably interfere with each other when the first lens and the second lens are brought close to each other.

According to the invention, the area of the second main sliding portion region is smaller than the area of the second holding portion region in the case of being vertically projected to the surface perpendicular to the second axis line, with the result that even when the distance between the first guide member and the second guide member is small, such a trouble can be avoided that the first main sliding portion and the second main sliding portion undesirably interfere with each other when the first lens and the second lens are brought close to each other.

According to the invention, the dimension in a direction along a first axis line L1 of the first main sliding portion is selected so as to satisfy L1>(D1·cos α1−d1)/sin α1, with the result that the first lens is inclined within the tolerable range, thus allowing for a favorable optical property.

According to the invention, the dimension in a direction along a second axis line L2 of the second main sliding portion is selected so as to satisfy L2>(D2·cos α2−d2)/sin α2, with the result that the second lens is inclined within the tolerable range, thus allowing for a favorable optical property.

According to the invention, the first driving means drives the first lens holder to be displaced along the first and third axis lines, and the second driving means drives the second lens holder to be displaced along the second and third axis lines, whereby the distance between the first lens and the second lens can be made to change with the respective lens having the optical axis in common.

According to the invention, the first pressing piece presses the first lens holder in the one direction along the first axis line, and the first spring force generating means presses the first lens holder in the other direction along the first axis line. The first driving source drives the first pressing piece to be displaced along the first axis line, whereby the first lens holder can be driven to be displaced along the first axis line. At this time, the first lens holder is pressed by the first spring force generating means in the other direction along the first axis line, thus being allowed to be prevented from jolting when driven to be displaced.

According to the invention, the first spring force generating means is the helical compression spring and externally fitted to the first guide member, thus being capable of avoiding the trouble that the helical compression spring undesirably comes off due to the impact upon collision when dropped or at the like occasion.

According to the invention, the dimension in a direction along a first axis line L1 of the first main sliding portion is selected so as to satisfy L1>2·μ1·(F1·h11+W1·h21)/(F1−W1), resulting in sufficiently small sliding resistance between the first main sliding portion and the first guide member such that the first lens can be smoothly displaced.

According to the invention, the second pressing piece presses the second lens holder in the one direction along the second axis line, and the second spring force generating means presses the second lens holder in the other direction along the second axis line. The second driving source drives the second pressing piece to be displaced along the second axis line, whereby the second lens holder can be driven to be displaced along the second axis line. At this time, the second lens holder is pressed by the second spring force generating means in the other direction along the second axis line, thus being allowed to be prevented from jolting when driven to be displaced.

According to the invention, the second spring force generating means is the helical compression spring and externally fitted to the second guide member, thus being capable of avoiding the trouble that the helical compression spring undesirably comes off due to the impact upon collision when dropped or at the like occasion.

According to the invention, the dimension in a direction along a second axis line L2 of the second main sliding portion is selected so as to satisfy L2>2·μ2·(F2·h12+W2·h22)/(F2−W2), resulting in sufficiently small sliding resistance between the second main sliding portion and the second guide member such that the second lens can be smoothly displaced.

The invention claimed is:

1. A lens unit comprising:
 a first guide member having a first axis line;
 second guide member having a second axis line parallel to the first axis line; and
 a third guide member having a third axis line parallel to the first and second axis lines,
 the lens unit comprising:
 a first lens holder having a first holding portion for holding a first lens, a first main sliding portion which is guided by sliding on the first guide member, and a first sub sliding portion which is guided by sliding on the third guide member and smaller than the first main sliding portion as viewed along the first axis line; and
 a second lens holder having a second holding portion for holding a second lens, a second main sliding portion which is guided by sliding on the second guide member, and a second sub sliding portion which is guided by sliding on the third guide member and smaller than the second main sliding portion as viewed along the second axis line.

2. The lens unit of claim 1, wherein the first main sliding portion is provided so as to protrude on a second holding portion-side relative to a first lens.

3. The lens unit of claim 1, wherein the second main sliding portion is disposed so as to protrude on a first holding portion-side relative to a second lens.

4. The lens unit of claim 1, wherein the first lens holder further includes a first reinforcing portion which reinforces a connecting part between the first main sliding portion and the first holding portion.

5. The lens unit of claim 1, wherein the second lens holder further includes a second reinforcing portion which reinforces a connecting part between the second main sliding portion and the second holding portion.

6. The lens unit of claim 1, wherein the first and second guide members are coupled to a member in common.

7. The lens unit of claim 1, wherein an area of the first main sliding portion region is smaller than an area of the first holding portion region in a case where the first lens holder is vertically projected to a surface perpendicular to the first axis line.

8. The lens unit of claim 1, wherein an area of the second main sliding portion region is smaller than an area of the second holding portion region in a case where the second lens holder is vertically projected to a surface perpendicular to the second axis line.

9. The lens unit of claim 1, wherein:
 the first guide member is formed to be columnar;
 the first main sliding portion is formed to be cylindrical into which the first guide member is inserted; and a dimension in a direction along a first axis line of the first main sliding portion is selected so as to satisfy the following expression:

$$L1 > (D1 \cdot \cos \alpha1 - d1)/\sin \alpha1$$

where L1 [m] represents a dimension in a direction along a first axis line of the first main sliding portion, D1 [m] represents an inner diameter of the first main sliding portion, d1 [m] represents an outer diameter of the first guide member, and α1 [rad] represents an inclination tolerance of the first lens holder.

10. The lens unit of claim 1, wherein:
the second guide member is formed to be columnar;
the second main sliding portion is formed to be cylindrical into which the second guide member is inserted; and
a dimension in a direction along a second axis line of the second main sliding portion is selected so as to satisfy the following expression:

$$L2 > (D2 \cdot \cos \alpha2 - d2)/\sin \alpha2$$

where L2 [m] represents a dimension in a direction along a second axis line of the second main sliding portion, D2 [m] represents an inner diameter of the second main sliding portion, d2 [m] represents an outer diameter of the second guide member, and α2 [rad] represents an inclination tolerance of the second lens holder.

11. A lens driving apparatus comprising:
the lens unit of claim 1;
first driving means for driving a first lens holder to be displaced along first and third axis lines; and
second driving means for driving a second lens holder to be displaced along second and third axis lines.

12. The lens driving apparatus of claim 11, wherein the first driving means comprises:
a first pressing piece which is provided so as to be displaceable along the first axis line and which contacts the first lens holder and presses the first lens holder in one direction along the first axis line;
a first driving source which drives the first pressing piece to be displaced along the first axis line; and
first spring force generating means for elastically pressing the first lens holder in another direction along the first axis line.

13. The lens driving apparatus of claim 12, wherein the first spring force generating means is a helical compression spring and externally fitted to a first guide member.

14. The lens driving apparatus of claim 12, wherein a dimension in a direction along a first axis line of a first main sliding portion is selected so as to satisfy the following expression:

$$L1 > 2 \cdot \mu1 \cdot (F1 \cdot h11 + W1 \cdot h21)/(F1 - W1)$$

where L1 [m] represents the dimension in a direction along a first axis line of the first main sliding portion, μ1 represents a static friction coefficient between the first guide member and the first main sliding portion, F1 [N] represents a press force of the first pressing piece in the one direction along the first axis line, h11 [m] represents a distance between a point of application of the press force and the first axis line, h21 [m] represents a distance between the first axis line and the third axis line, and W1 [N] represents sliding resistance between a third guide member and a first sub sliding portion.

15. The lens driving unit of claim 11, wherein the second driving means comprises:
a second pressing piece which is provided so as to be displaceable along the second axis line and which contacts the second lens holder and presses the second lens holder in one direction along the second axis line;
a second driving source which drives the second pressing piece to be displaced along the second axis line; and
second spring force generating means for elastically pressing the second lens holder in another direction along the second axis line.

16. The lens driving apparatus of claim 15, wherein the second sprig force generating means is a helical compression spring and externally fitted to a second guide member.

17. The lens driving apparatus of claim 15, wherein a dimension in a direction along a second axis line of a second main sliding portion is selected so as to satisfy the following expression:

$$L2 > 2 \cdot \mu2 \cdot (F2 \cdot h12 + W2 \cdot h22)/(F2 - W2)$$

where L2 [m] represents the dimension in a direction along a second axis line of the second main sliding portion, μ2 represents a static friction coefficient between the second guide member and the second main sliding portion, F2 [N] represents a press force of the second pressing piece in the one direction along the second axis line, h12 [m] represents a distance between a point of application of the press force and the second axis line, h22 [m] represents a distance between the second axis line and the third axis line, and W2 [N] represents sliding resistance between a third guide member and a second sub sliding portion.

* * * * *